United States Patent
Conley et al.

(10) Patent No.: US 12,304,410 B2
(45) Date of Patent: May 20, 2025

(54) WINCH MOUNTING SYSTEMS

(71) Applicant: BPG-ARROWHEAD WINCH INC, Broken Arrow, OK (US)

(72) Inventors: Jacob Conley, Broken Arrow, OK (US); Jeffrey Bouvier, Lewisville, TX (US)

(73) Assignee: BPG-ARROWHEAD WINCH INC., Broken Arrow, OK (US)

( * ) Notice: Subject to any disclaimer, the term of this patent is extended or adjusted under 35 U.S.C. 154(b) by 600 days.

(21) Appl. No.: 17/667,403

(22) Filed: Feb. 8, 2022

(65) Prior Publication Data
US 2023/0249637 A1 Aug. 10, 2023

(51) Int. Cl.
*B60R 19/48* (2006.01)
*B60R 19/24* (2006.01)
*B62D 65/16* (2006.01)
*B66D 1/28* (2006.01)

(52) U.S. Cl.
CPC .............. *B60R 19/48* (2013.01); *B60R 19/24* (2013.01); *B62D 65/16* (2013.01); *B66D 1/28* (2013.01)

(58) Field of Classification Search
CPC ......... B60R 19/48; B60R 19/24; B62D 65/16; B66D 1/28; B66D 2700/0183; B60D 1/485; B60D 1/488; B60D 1/56; B60D 1/50; B60D 1/00
USPC ........................................................ 293/117
See application file for complete search history.

(56) References Cited

U.S. PATENT DOCUMENTS

| | | | | |
|---|---|---|---|---|
| 2005/0275194 A1* | 12/2005 | Wegener | ................... | B60D 1/56 280/500 |
| 2006/0289844 A1* | 12/2006 | McFarland | .............. | B66D 1/00 254/264 |
| 2010/0237639 A1* | 9/2010 | Handing | ................. | B60R 19/03 29/458 |

FOREIGN PATENT DOCUMENTS

| CN | 203126423 U | * | 8/2013 |
|---|---|---|---|
| CN | 203920900 U | * | 11/2014 |
| CN | 105480140 A | * | 4/2016 |
| CN | 207106430 U | * | 3/2018 |

OTHER PUBLICATIONS

CN105480140A computer translation (Year: 2016).*
CN 203126423U computer translation (Year: 2013).*
CN203920900U computer translation (Year: 2014).*
CN 207106430U computer translation (Year: 2018).*

* cited by examiner

Primary Examiner — Lori Lyjak
(74) Attorney, Agent, or Firm — Seed IP Law Group LLP

(57) ABSTRACT

A system includes a frame assembly having a first set of bolt holes arranged in a first pattern, a mounting plate having a second set of bolt holes arranged in a second pattern, wherein the second pattern is the same as the first pattern, a bumper having a third set of bolt holes arranged in a third pattern, wherein the third pattern is the same as the first pattern and the second pattern, and a winch coupled to the bumper.

19 Claims, 15 Drawing Sheets

WINCH MOUNTING SYSTEMS

BACKGROUND

Technical Field

The present disclosure relates generally to vehicles having winches mounted thereto, and more particularly to methods and systems for reliably and securely mounting winches to vehicles.

Description of the Related Art

Many vehicles currently in service have a winch mounted to a front end thereof. Such vehicles may include mobile construction, forestry, service, and agricultural equipment (including track-type or wheeled machinery, construction equipment, or vehicles, including tractors, skidders, bulldozers, loaders, graders, backhoes, harvesters, feller-bunchers, forwarders, and on-road or off-road trucks).

Traditionally, there has not been a consistent, reliable mechanism or method for mounting winches to such vehicles. In particular, a consumer or end user may purchase a vehicle from a first manufacturer and a winch from a second manufacturer, and be left with the responsibility of mounting the winch to the vehicle themselves. In some cases, this has resulted in the mounting mechanism being, to some extent, improvised, and has ultimately led, in some cases, to disadvantages in terms of efficiency and reliability of the mounting mechanism and/or process.

BRIEF SUMMARY

A heavy-duty vehicle may be summarized as comprising: a front frame assembly having a first set of bolt holes arranged in a first pattern; a mounting plate having a second set of bolt holes arranged in a second pattern, wherein the second pattern is the same as the first pattern, and wherein the mounting plate is coupled to the front frame assembly; a bumper having a third set of bolt holes arranged in a third pattern, wherein the third pattern is the same as the first pattern and the second pattern, and wherein the bumper is coupled to the mounting plate and the front frame assembly; a set of bolts coupling the bumper and the mounting plate to the front frame assembly, wherein the set of bolts extend through the first, second, and third sets of bolt holes; and a winch coupled to the bumper, whereby the combination of the winch and bumper are fixed to the front frame assembly via the set of bolts with the mounting plate positioned between the bumper and the front frame assembly.

The front frame assembly, the mounting plate, and the bumper may be coupled to one another without welds. The front frame assembly, the mounting plate, and the bumper may be coupled to one another solely by the set of bolts. The winch may be coupled to the bumper solely by a second set of bolts. The mounting plate may include a fourth set of bolt holes that provide clearance for the second set of bolts.

A method may be summarized as comprising: coupling a bumper and a winch coupled to the bumper to a mounting plate and a front frame assembly of a heavy-duty vehicle, the front frame assembly having a first set of bolt holes arranged in a first pattern, the mounting plate having a second set of bolt holes arranged in a second pattern, the second pattern the same as the first pattern, and the bumper having a third set of bolt holes arranged in a third pattern, the third pattern the same as the first pattern and the second pattern; wherein coupling the bumper and the winch coupled to the bumper to the mounting plate and the front frame assembly includes positioning a set of bolts to extend through the first, second, and third sets of bolt holes.

Coupling the bumper and the winch coupled to the bumper to the mounting plate and the front frame assembly may include not welding the bumper, mounting plate, or front frame assembly to one another.

A system may be summarized as comprising: a frame assembly having a first set of bolt holes arranged in a first pattern; a mounting plate having a second set of bolt holes arranged in a second pattern, wherein the second pattern is the same as the first pattern; a bumper having a third set of bolt holes arranged in a third pattern, wherein the third pattern is the same as the first pattern and the second pattern; and a winch coupled to the bumper.

The mounting plate may be adjacent to the frame assembly and to the bumper such that the second set of bolt holes is adjacent to the first set of bolt holes and the third set of bolt holes. The frame assembly, the mounting plate, and the bumper may be coupled to one another by a set of bolts extending through the first, second, and third sets of bolt holes. The frame assembly, the mounting plate, and the bumper may be coupled to one another without welds. The frame assembly, the mounting plate, and the bumper may be coupled to one another solely by the set of bolts. The winch may be coupled to the bumper solely by a second set of bolts. The mounting plate may include a fourth set of bolt holes that provide clearance for the second set of bolts. The frame assembly may be a front frame assembly of a heavy-duty truck. The system and the winch may be rated to pull loads of at least 20,000 lbs. or at least 40,000 lbs. The mounting plate may be made of high-strength steel having a yield strength of at least 50 ksi. The first, second, and third patterns may each include a rectangle or a trapezoid.

BRIEF DESCRIPTION OF THE SEVERAL VIEWS OF THE DRAWINGS

FIG. 16 illustrates the same features as FIG. 15, but with the mounting plate removed from other components of the second truck.

FIG. 20 illustrates a rear and top perspective view of the winch, bumper, and mounting plate of the second truck, with other components of the second truck removed.

FIG. 21 illustrates a rear and top perspective view of the winch and bumper of the second truck, with the mounting plate and a set of bolts removed.

DETAILED DESCRIPTION

Figure 1:
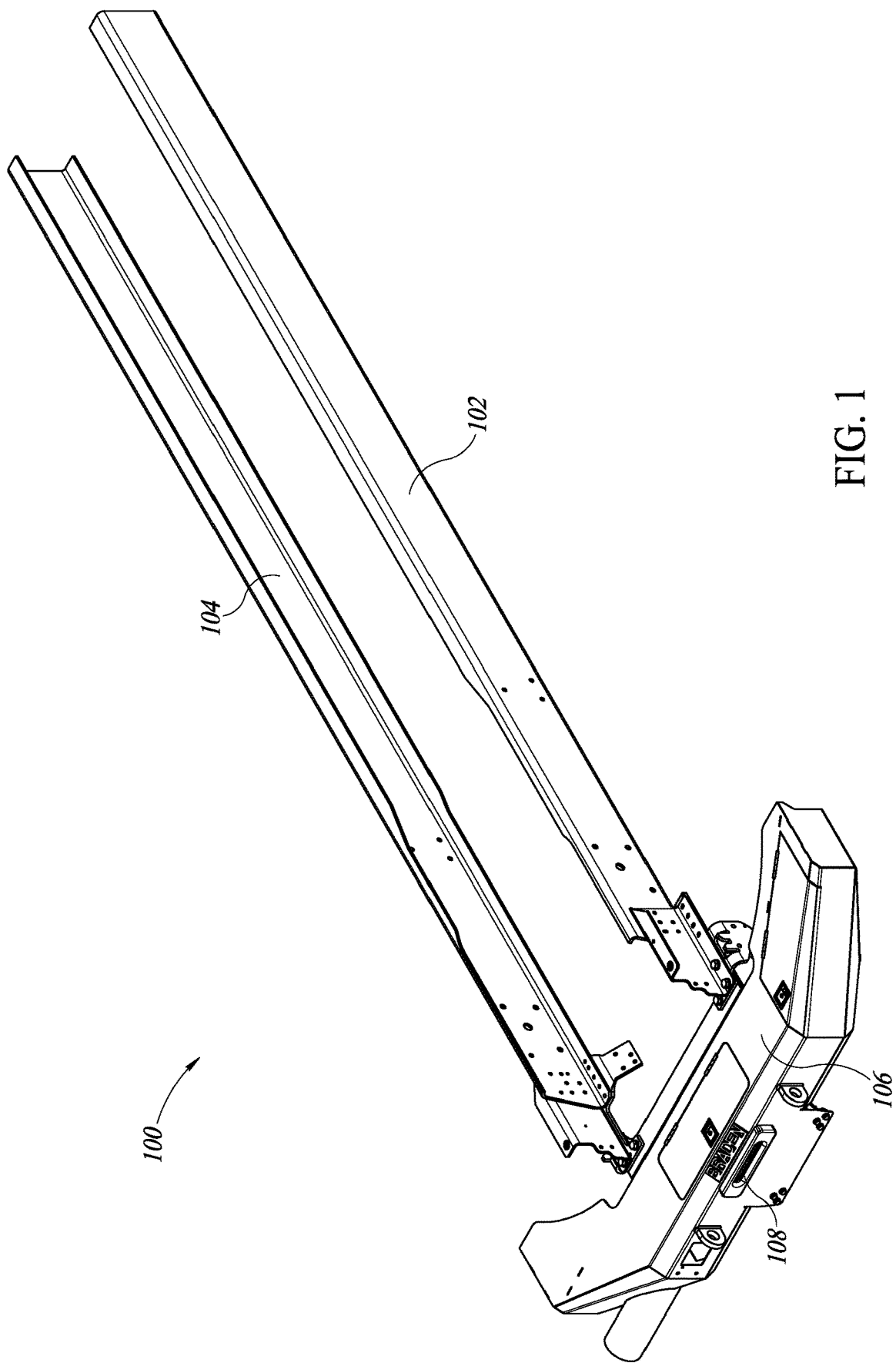
FIG. 1 illustrates a front and top perspective view of a winch and a bumper mounted to other components of a first truck.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

FIG. 1 illustrates a system 100 comprising components of a chassis of a vehicle such as a truck, including a first chassis frame rail 102, which may be a left-hand side or left chassis frame rail 102, and a second chassis frame rail 104, which may be a right-hand side or right chassis frame rail 104. As used herein, the phrases "left-hand side" and "left" generally refer to the side of a truck that is on the left from the perspective of an occupant who is facing forward inside the truck, which is generally where a driver's seat and controls are located in a vehicle manufactured for the American market or any other market that drives on the right side of the roadway. Similarly, as used herein, the phrases "right-hand side" and "right" generally refer to the side of a truck that is on the right from the perspective of an occupant who is facing forward inside the truck, which is generally where a passenger's seat is located in a vehicle manufactured for the American market or any other market that drives on the right side of the roadway.

As used herein, the phrases "front" and "back" and other similar terminology take their common meaning, such that a cabin and an engine of a truck are generally at the front of the truck and opposite the rear of the truck. As used herein, the phrases "up," "down," "above," and "below," and other similar terminology, take their common meaning, that is, such that gravity pulls objects down. When used herein in reference to structural features, the phrases "vertical," "vertically," "horizontal," and "horizontally" are approximations rather than exact descriptors of orientations.

Figure 2:
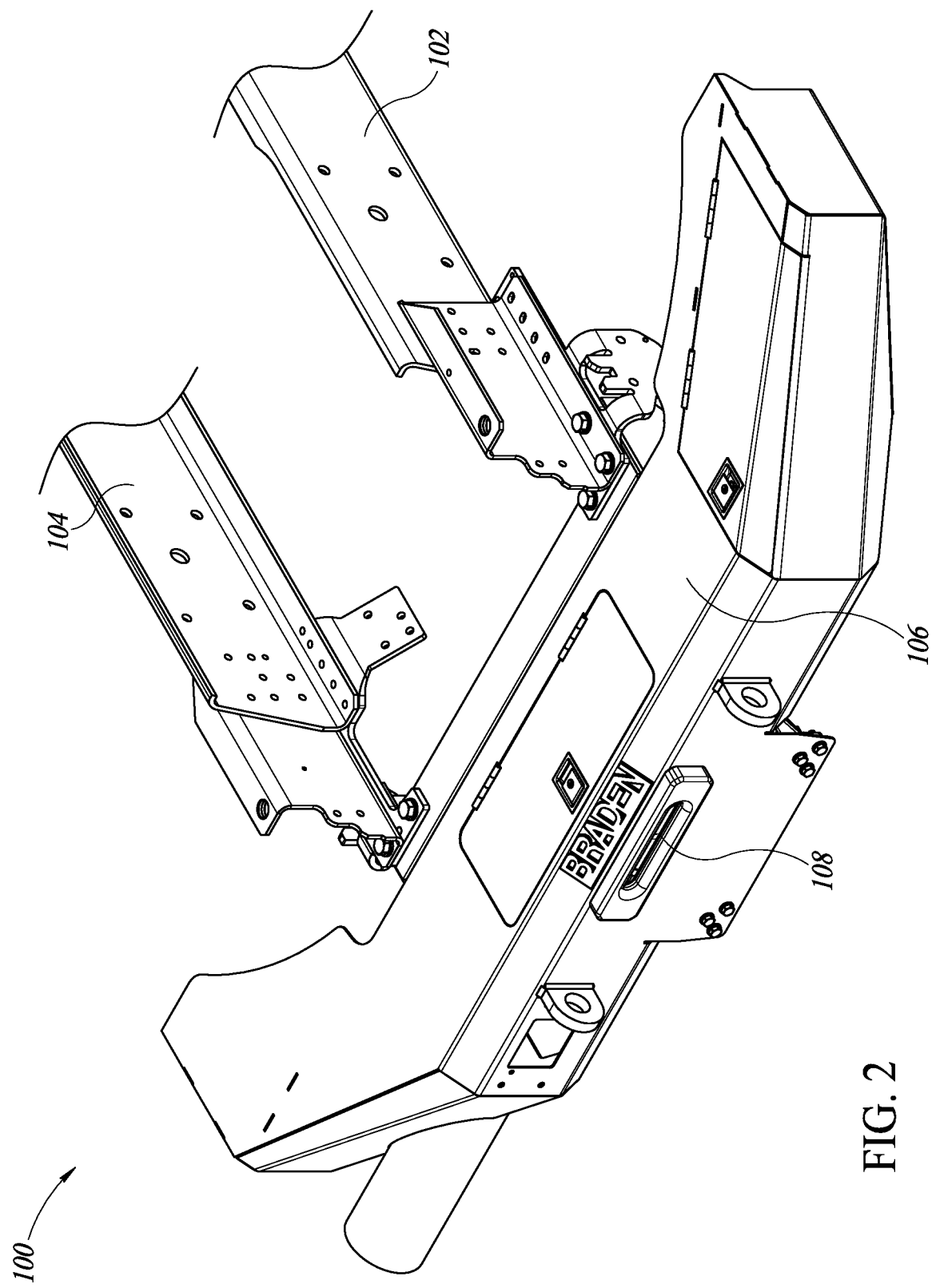
FIG. 2 illustrates a portion of FIG. 1 at a larger scale.

FIG. 1 further illustrates that the system 100 comprises a front bumper 106 coupled at a left side portion thereof to a front end portion of the left chassis frame rail 102 and coupled at a right side portion thereof to a front end portion of the right chassis frame rail 104. FIG. 2 illustrates a portion of FIG. 1 at a larger scale. As seen more clearly in FIG. 2, the bumper 106 includes an opening 108 in a front end thereof, through which a cable, chain, rope, wire, or other line can extend, such as from a winch housed within the bumper 106 to an object outside of the bumper 106 to be moved by the truck and/or the winch.

Figure 3:
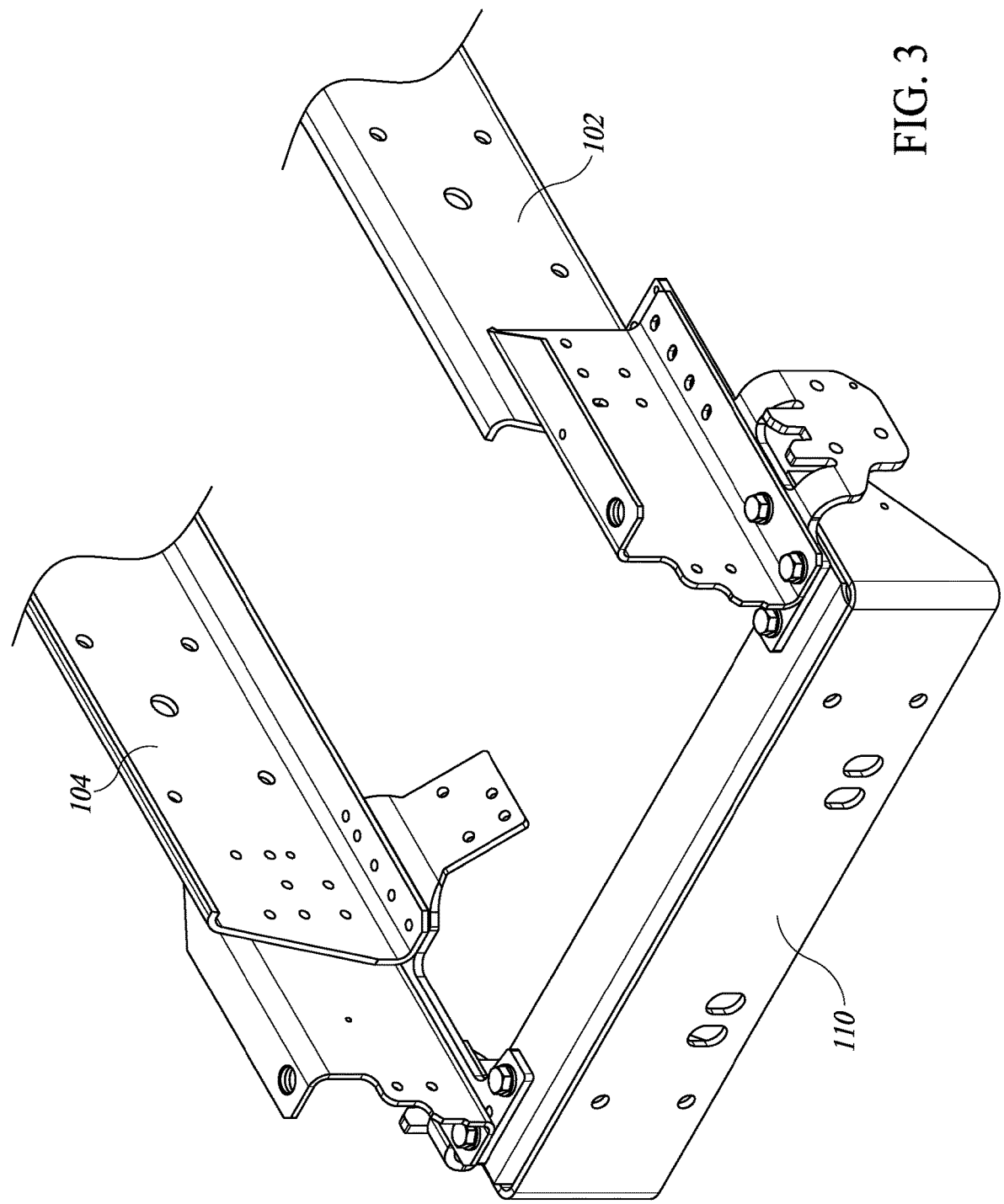
FIG. 3 illustrates the same features as FIG. 2, but with the winch and the bumper removed from the other components of the first truck to reveal a mounting plate mounted to other components of the first truck.

FIG. 3 illustrates the system 100 with the bumper 106 and the winch removed to reveal additional components of the chassis of the truck, including a front frame assembly 112 thereof coupled to the left chassis frame rail 102 and the right chassis frame rail 104. In particular, FIG. 3 illustrates that the front frame assembly 112 is coupled directly at a left side portion thereof to a front end portion of the left chassis frame rail 102 and coupled directly at a right side portion thereof to a front end portion of the right chassis frame rail 104. FIG. 3 also illustrates a mounting plate 110 that is coupled to a front end of the front frame assembly 112. In particular, FIG. 3 illustrates that a rear surface of the mounting plate 110 is mounted flush against, and coupled directly to, a front surface of the front frame assembly 112, such that the mounting plate 110 and any other components coupled thereto are coupled to the left chassis frame rail 102 and the right chassis frame rail 104 indirectly by the front frame assembly 112.

Figure 4:
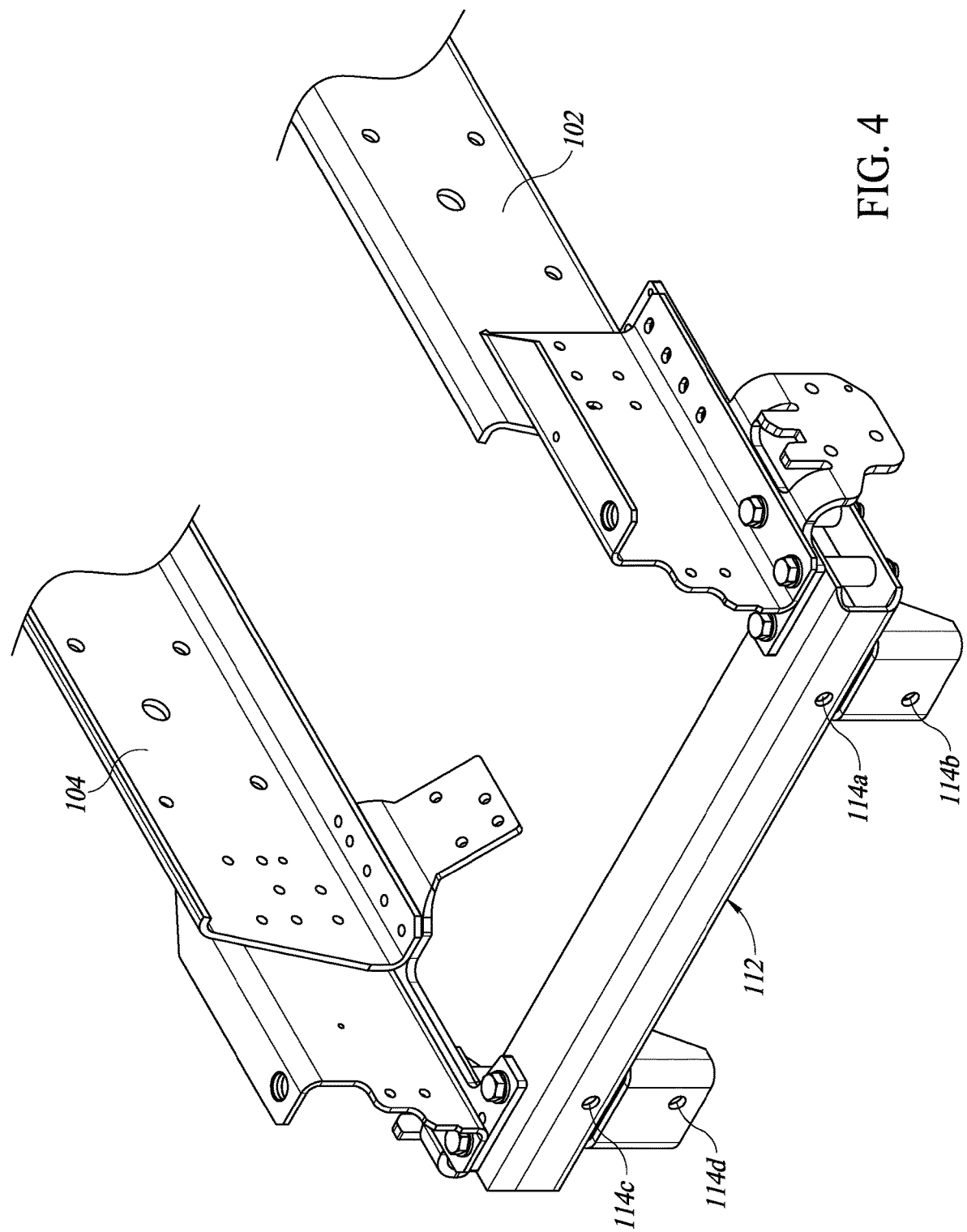
FIG. 4 illustrates the same features as FIG. 3, but with the mounting plate removed from the other components of the first truck.

FIG. 4 illustrates the same components from the same perspective as in FIG. 3, but with the mounting plate 110 removed, such that additional features, such as those of the front frame assembly 112, are revealed and visible. For example, FIG. 4 illustrates that the front frame assembly 112 includes four circular bolt holes that extend front-to-back through components thereof. In particular, FIG. 4 illustrates that the front frame assembly 112 includes a first or left pair of bolt holes 114a and 114b at a left end portion thereof and a second or right pair of bolt holes 114c and 114d at a right end portion thereof. As illustrated in FIG. 4, bolt hole 114a is located directly above bolt hole 114b at the left side portion of the front frame assembly 112 and bolt hole 114c is located directly above bolt hole 114d at the right side portion of the front frame assembly 112. The bolt holes 114a, 114b, 114c, and 114d have central longitudinal axes that extend forward and rearward through components of the front frame assembly 112, and are thus configured to receive bolts that couple and secure the mounting plate 110 to the front end surface of the front frame assembly 112.

Figure 5:
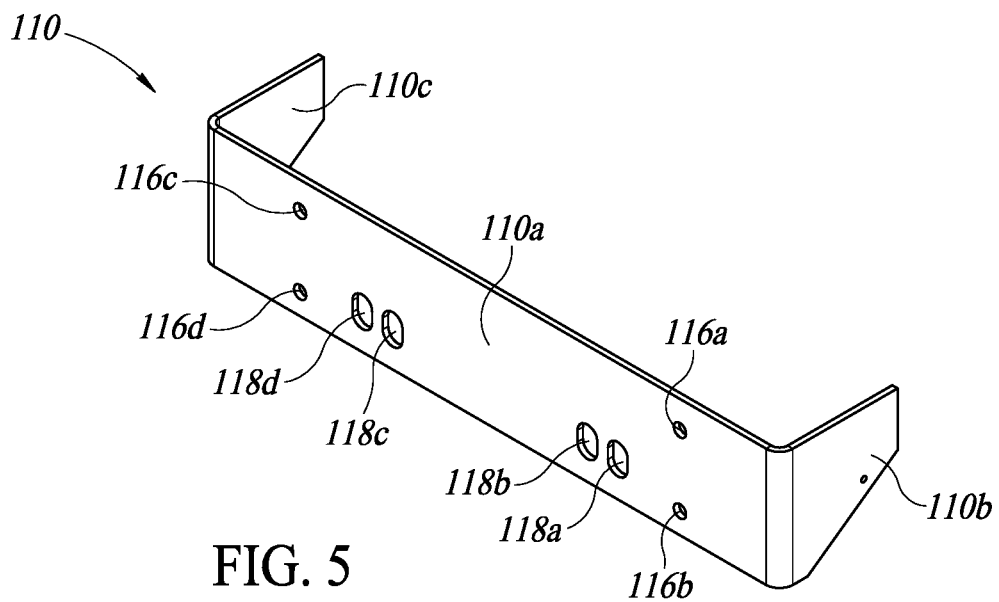
FIG. 5 illustrates a front and top perspective view of the mounting plate.
Figure 6:
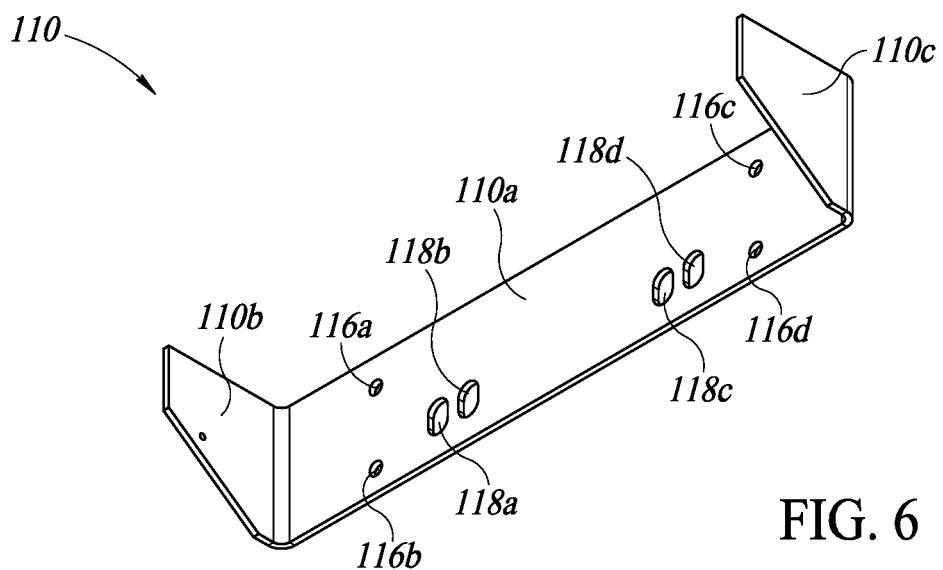
FIG. 6 illustrates a rear and bottom perspective view of the mounting plate.
Figure 7:
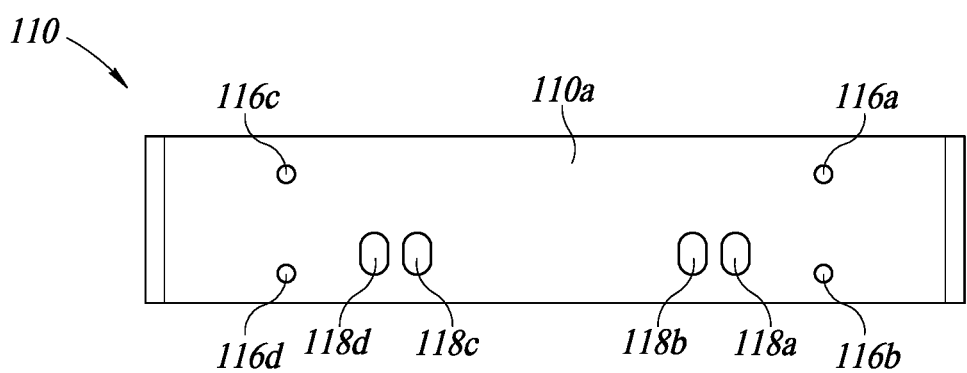
FIG. 7 illustrates a front view of the mounting plate.

FIGS. 5, 6, and 7 illustrate a front and top perspective view, a rear and bottom perspective view, and a front view of the mounting plate 110, respectively. As illustrated in FIGS. 5-7, the mounting plate 110 includes a main body portion 110a, a first or left side portion 110b, and a second or right side portion 110c. The main body portion 110a of the mounting plate 110 includes a generally rectangular or rectilinear body or sheet of material having a long dimension or length extending side-to-side or left-to-right, such that the main body portion 110a can span across substantially the entire width of a truck. The main body portion 110a of the mounting plate 110 also has a relatively short dimension or height extending up-and-down or top-to-bottom, and a smallest dimension or a thickness extending in a front-to-back direction.

FIGS. 5-7 illustrate that the main body portion 110a includes a first set of four circular bolt holes 116a, 116b, 116c, and 116d that extend front-to-back through the main body portion 110a and that are arranged to be complementary to the bolt holes 114a, 114b, 114c, and 114d. In particular, FIGS. 5-7 illustrate that the main body portion 110a of the mounting plate 110 includes a first or left pair of bolt holes 116a and 116b at a left end portion thereof and a second or right pair of bolt holes 116c and 116d at a right end portion thereof. As illustrated in FIGS. 5-7, bolt hole 116a is located directly above bolt hole 116b at the left side portion of the front frame assembly 112 and bolt hole 116c is located directly above bolt hole 116d at the right side portion of the front frame assembly 112. The bolt holes 116a, 116b, 116c, and 116d have central longitudinal axes that extend forward and rearward and that are aligned with or coaxial with those of the bolt holes 114a, 114b, 114c, and 114d. Thus, when the system 100 is assembled, bolt hole 114a is adjacent to bolt hole 116a, bolt hole 114b is adjacent to bolt hole 116b, bolt hole 114c is adjacent to bolt hole 116c, and bolt hole 114d is adjacent to bolt hole 116d.

As illustrated in FIGS. 5-7, the bolt holes 116a, 116b, 116c, and 116d are arranged at respective corners of a rectangular shape. In some embodiments, a distance (such as a center-to-center distance) between the bolt holes 116a and 116b and the bolt holes 116c and 116d may be between 600 and 750 mm, between 650 and 700 mm, between 670 and 680 mm, or about 675.7 mm. Similarly, in some embodiments, a distance (such as a center-to-center distance) between the bolt holes 116a and 116c and the bolt holes 116b and 116d may be between 100 and 150 mm, between 120 and 130 mm, or about 125 mm. In some embodiments, the mounting plate 110 may be made of high-strength steel, such as a steel having a yield strength of at least 50 ksi.

Further, when the system 100 is assembled, a first bolt can extend through the bolt holes 114a and 116a, with a head of the first bolt and/or a washer adjacent to the head of the first bolt proximate to or resting flush against a front surface of the mounting plate 110, and a nut threaded onto the first bolt and/or a washer adjacent to the nut proximate to or resting flush against a rear surface of the front frame assembly 112. Further, when the system 100 is assembled, a second bolt can extend through the bolt holes 114b and 116b, with a head of the second bolt and/or a washer adjacent to the head of the second bolt proximate to or resting flush against a front surface of the mounting plate 110, and a nut threaded onto the second bolt and/or a washer adjacent to the nut proximate to or resting flush against a rear surface of the front frame assembly 112.

Further, when the system 100 is assembled, a third bolt can extend through the bolt holes 114c and 116c, with a head of the third bolt and/or a washer adjacent to the head of the third bolt proximate to or resting flush against a front surface of the mounting plate 110, and a nut threaded onto the third bolt and/or a washer adjacent to the nut proximate to or resting flush against a rear surface of the front frame assembly 112. Further, when the system 100 is assembled, a fourth bolt can extend through the bolt holes 114d and 116d, with a head of the fourth bolt and/or a washer adjacent to the head of the fourth bolt proximate to or resting flush against a front surface of the mounting plate 110, and a nut threaded onto the fourth bolt and/or a washer adjacent to the nut proximate to or resting flush against a rear surface of the front frame assembly 112. Thus, the first, second, third, and fourth bolts, and their respective heads, nuts, and washers, can securely couple and mount the mounting plate 110 to the front surface of the front frame assembly 112.

In an alternative embodiment, when the system 100 is assembled, a first bolt can extend through the bolt holes 114a and 116a, with a head of the first bolt and/or a washer adjacent to the head of the first bolt proximate to or resting flush against a rear surface of the front frame assembly 112, and a nut threaded onto the first bolt and/or a washer adjacent to the nut proximate to or resting flush against a front surface of the mounting plate 110. Further, in the alternative embodiment, when the system 100 is assembled, a second bolt can extend through the bolt holes 114b and 116b, with a head of the second bolt and/or a washer adjacent to the head of the second bolt proximate to or resting flush against a rear surface of the front frame assembly 112, and a nut threaded onto the second bolt and/or a washer adjacent to the nut proximate to or resting flush against a front surface of the mounting plate 110.

Further, in the alternative embodiment, when the system 100 is assembled, a third bolt can extend through the bolt holes 114c and 116c, with a head of the third bolt and/or a washer adjacent to the head of the third bolt proximate to or resting flush against a rear surface of the front frame assembly 112, and a nut threaded onto the third bolt and/or a washer adjacent to the nut proximate to or resting flush against a front surface of the mounting plate 110. Further, in the alternative embodiment, when the system 100 is assembled, a fourth bolt can extend through the bolt holes 114d and 116d, with a head of the fourth bolt and/or a washer adjacent to the head of the fourth bolt proximate to or resting flush against a rear surface of the front frame assembly 112, and a nut threaded onto the fourth bolt and/or a washer adjacent to the nut proximate to or resting flush against a front surface of the mounting plate 110. Thus, the first, second, third, and fourth bolts, and their respective heads, nuts, and washers, can securely couple and mount the mounting plate 110 to the front surface of the front frame assembly 112.

FIGS. 5-7 also illustrate that the main body portion 110a of the mounting plate 110 includes a second set of four bolt holes 118a, 118b, 118c, and 118d that extend front-to-back through the main body portion 110a. In particular, FIGS. 5-7 illustrate that the main body portion 110a of the mounting plate 110 includes a first or left pair of bolt holes 118a and 118b at a left end portion thereof and a second or right pair of bolt holes 118c and 118d at a right end portion thereof. As illustrated in FIGS. 5-7, bolt hole 118a is located directly to the left of bolt hole 118b at the left side portion of the main body portion 110a of the mounting plate 110 and bolt hole 118c is located directly to the left of bolt hole 118d at the right side portion of the main body portion 110a of the mounting plate 110.

As further illustrated in FIGS. 5-7, the bolt holes 118a, 118b, 118c, and 118d are arranged in a single straight line, such that the bolt hole 118a is directly to the left of the bolt hole 118b, the bolt hole 118b is directly to the left of the bolt hole 118c, and the bolt hole 118c is directly to the left of the bolt hole 118d. Further, a first distance (e.g., a center-to-center distance) between the bolt holes 118a and 118b is smaller than a second distance (e.g., a center-to-center distance) between the bolt holes 118b and 118c, but is the same as a third distance (e.g., a center-to-center distance) between the bolt holes 118c and 118d. Additionally, the bolt holes 118a, 118b, 118c, and 118d are collectively located inboard of the bolt holes 116a, 116b, 116c, and 116d. That is, the left pair of bolt holes 116a and 116b is located to the left of the left pair of bolt holes 118a and 118b, and the right pair of bolt holes 116c and 116d is located to the right of the right pair of bolt holes 118c and 118d. Further, the bolt holes 118a, 118b, 118c, and 118d are each located in a lower portion of the main body portion 110a of the mounting plate 110. That is, a center of each of the bolt holes 118a, 118b, 118c, and 118d is located below a central longitudinal axis of the main body portion 110a of the mounting plate 110.

Additionally, each of the bolt holes 118a, 118b, 118c, and 118d is not circular. Rather, the bolt holes 118a, 118b, 118c, and 118d may be slots and may each have a shape including an oval or a geometric "stadium," that is, a rectangle with semicircles at a pair of opposite sides, which may also be referred to as a discorectangle or an obround, with long axes thereof extending vertically. Such shapes may provide a degree of margin or clearance for locations of counterpart bolts, heads of bolts, nuts threaded onto bolts, or washers on bolts, such as of bolts and related hardware used to couple a rear portion of the bumper 106 to the winch mounted and housed therein. The bolt holes 118a, 118b, 118c, and 118d have central longitudinal axes that extend forward and rearward through the main body portion 110a of the mounting plate 110.

FIGS. 5-7 also illustrate that the first or left side portion 110b of the mounting plate 110 includes a body or sheet of material having a long dimension or length that extends front-to-back from a front end portion thereof coupled to a left end portion of the main body 110a, directly rearward toward a rear end portion thereof. The left side portion 110b of the mounting plate 110 also has a relatively short dimension or height extending up-and-down or top-to-bottom that tapers as it extends rearward from the main body portion 110a of the mounting plate 110. The left side portion 110b of the mounting plate 110 also has a smallest dimension or a thickness extending in a side-to-side or left-to-right direction.

FIGS. 5-7 also illustrate that the second or right side portion 110c of the mounting plate 110 includes a body or sheet of material having a long dimension or length that extends front-to-back from a front end portion thereof coupled to a right end portion of the main body 110a, directly rearward toward a rear end portion thereof. The right side portion 110c of the mounting plate 110 also has a relatively short dimension or height extending up-and-down or top-to-bottom that tapers as it extends rearward from the main body portion 110a of the mounting plate 110. The right side portion 110c of the mounting plate 110 also has a smallest dimension or a thickness extending in a side-to-side or left-to-right direction.

Figure 8:
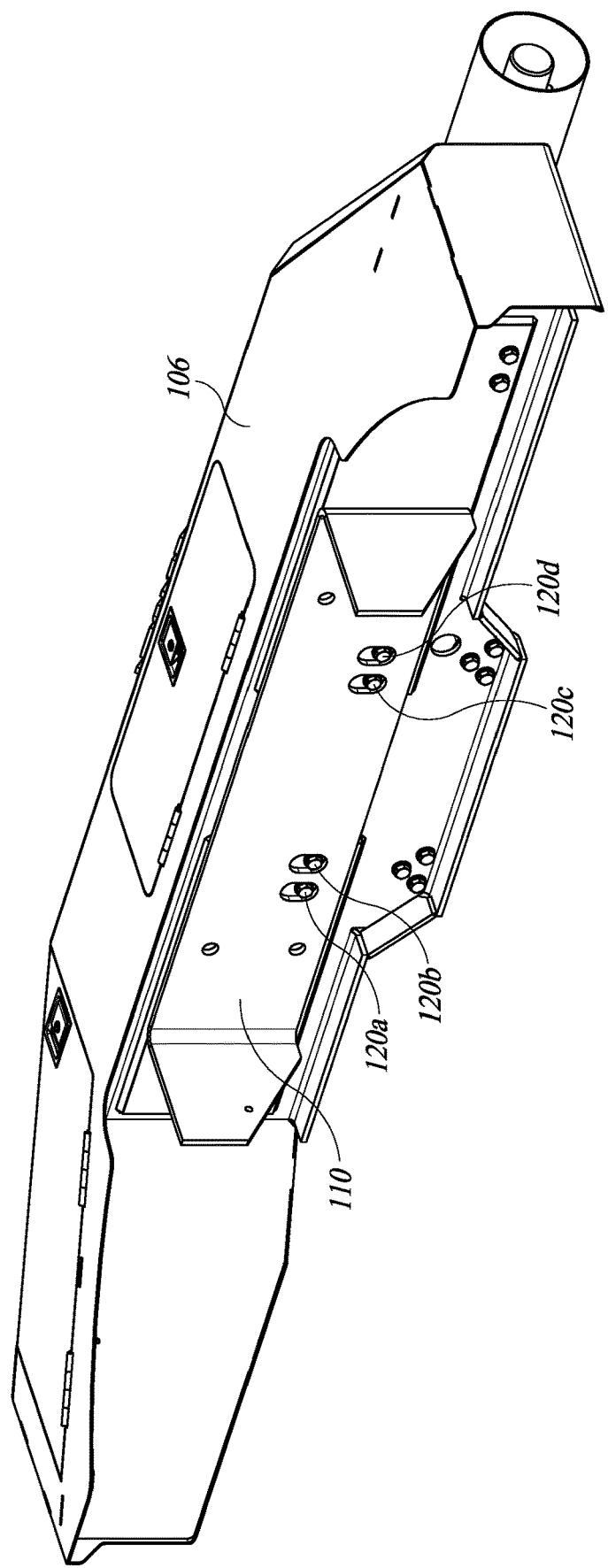
FIG. 8 illustrates a rear and top perspective view of the winch, bumper, and mounting plate, with other components of the first truck removed.
Figure 9:
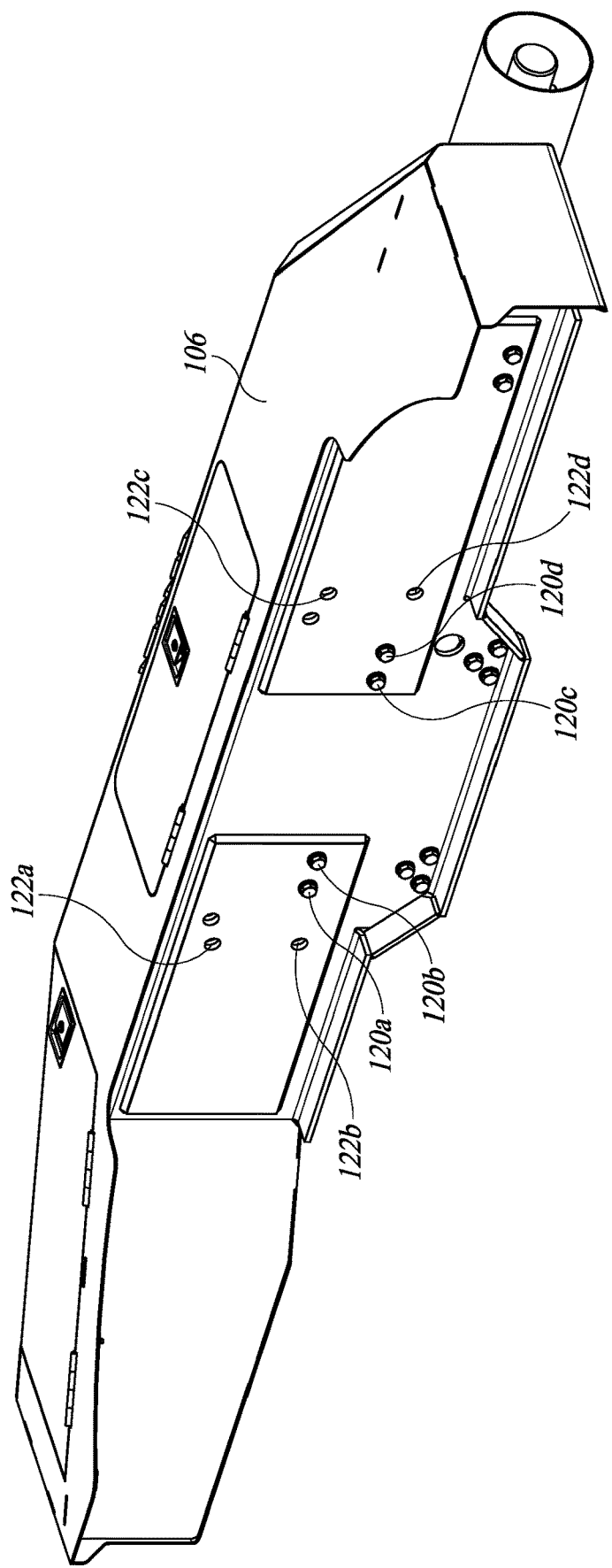
FIG. 9 illustrates the same features as FIG. 8, but with the mounting plate removed.

FIG. 8 illustrates a rear and top perspective view of the bumper 106 with a winch housed therein, and the mounting plate 110 securely mounted to a rear portion of the bumper 106 and the winch housed therein, and FIG. 9 illustrates the same features as FIG. 8, but with the mounting plate 110 removed. In particular, FIGS. 8 and 9 illustrate that the rear portion of the bumper 106 and the winch housed therein include a set of four bolts 120a, 120b, 120c, and 120d that extend front-to-back through the rear portion of the bumper 106 and the winch housed therein to securely mount and rigidly couple the winch to the rear portion of the bumper 106, and that the bolts 120a, 120b, 120c, and 120d are arranged in a pattern complementary to that of the bolt holes 118a, 118b, 118c, and 118d. In particular, FIGS. 8 and 9 illustrate that the rear portion of the bumper 106 and the winch housed therein include a first or left pair of bolts 120a and 120b at a left end portion thereof and a second or right pair of bolts 120c and 120d at a right end portion thereof. As illustrated in FIGS. 8 and 9, bolt 120a is located directly to the left of bolt 120b and bolt 120c is located directly to the left of bolt 120d.

As further illustrated in FIGS. 8 and 9, the bolts 120a, 120b, 120c, and 120d are arranged in a single straight line, such that the bolt 120a is directly to the left of the bolt 120b, the bolt 120b is directly to the left of the bolt 120c, and the bolt 120c is directly to the left of the bolt 120d. Further, a first distance (e.g., a center-to-center distance) between the bolts 120a and 120b is smaller than a second distance (e.g., a center-to-center distance) between the bolts 120b and 120c, but is the same as a third distance (e.g., a center-to-center distance) between the bolts 120c and 120d. Additionally, the first distance (e.g., a center-to-center distance) between the bolts 120a and 120b is the same as the first distance (e.g., a center-to-center distance) between the bolt holes 118a and 118b, the second distance (e.g., a center-to-center distance) between the bolts 120b and 120c is the same as the second distance (e.g., a center-to-center distance) between the bolt holes 118b and 118c, and the third distance (e.g., a center-to-center distance) between the bolts 120c and 120d is the same as the third distance (e.g., a center-to-center distance) between the bolt holes 118c and 118d.

The bolts 120a, 120b, 120c, and 120d have central longitudinal axes that extend forward and rearward and that are aligned with or coaxial with those of the bolt holes 118a, 118b, 118c, and 118d. Thus, when the system 100 is assembled, bolt hole 118a is adjacent to and receives bolt 120a, providing clearance for a head of the bolt 120a or for a nut threaded onto the bolt 120a, and/or for a washer mounted on the bolt 120a, bolt hole 118b is adjacent to and receives bolt 120b, providing clearance for a head of the bolt 120b or for a nut threaded onto the bolt 120b, and/or for a washer mounted on the bolt 120b, bolt hole 118c is adjacent to and receives bolt 120c, providing clearance for a head of the bolt 120c or for a nut threaded onto the bolt 120c, and/or for a washer mounted on the bolt 120c, and bolt hole 118d is adjacent to and receives bolt 120d, providing clearance for a head of the bolt 120d or for a nut threaded onto the bolt 120d, and/or for a washer mounted on the bolt 120d.

FIGS. 8 and 9 also illustrate that the rear portion of the bumper 106 includes a set of four circular bolt holes 122a, 122b, 122c, and 122d that extend front-to-back through the rear portion of the bumper 106 and that are arranged to be complementary to the bolt holes 114a, 114b, 114c, and 114d and to the bolt holes 116a, 116b, 116c, and 116d. In particular, FIGS. 8 and 9 illustrate that the rear portion of the bumper 106 includes a first or left pair of bolt holes 122a and 122b at a left end portion thereof and a second or right pair of bolt holes 122c and 122d at a right end portion thereof. As illustrated in FIGS. 8 and 9, bolt hole 122a is located directly above bolt hole 122b at the left side portion of the rear portion of the bumper 106 and bolt hole 122c is located directly above bolt hole 122d at the right side portion of the rear portion of the bumper 106. The bolt holes 122a, 122b, 122c, and 122d have central longitudinal axes that extend forward and rearward and that are aligned with or coaxial with those of the bolt holes 114a, 114b, 114c, and 114d and of the bolt holes 116a, 116b, 116c, and 116d. Thus, when the system 100 is assembled, bolt hole 116a is adjacent to bolt hole 122a, bolt hole 116b is adjacent to bolt hole 122b, bolt hole 116c is adjacent to bolt hole 122c, and bolt hole 116d is adjacent to bolt hole 122d.

Further, when the system 100 is assembled, a first bolt extends through the bolt holes 114a, 116a, and 122a, with a head of the first bolt and/or a washer adjacent to the head of the first bolt proximate to or resting flush against a front surface of the rear portion of the bumper 106, and a nut threaded onto the first bolt and/or a washer adjacent to the nut proximate to or resting flush against a rear surface of the front frame assembly 112. Further, when the system 100 is assembled, a second bolt extends through the bolt holes 114b, 116b, and 122b, with a head of the second bolt and/or a washer adjacent to the head of the second bolt proximate to or resting flush against a front surface of the rear portion of the bumper 106, and a nut threaded onto the second bolt and/or a washer adjacent to the nut proximate to or resting flush against a rear surface of the front frame assembly 112.

Further, when the system 100 is assembled, a third bolt extends through the bolt holes 114c, 116c, and 122c, with a head of the third bolt and/or a washer adjacent to the head of the third bolt proximate to or resting flush against a front surface of the rear portion of the bumper 106, and a nut threaded onto the third bolt and/or a washer adjacent to the nut proximate to or resting flush against a rear surface of the front frame assembly 112. Further, when the system 100 is assembled, a fourth bolt extends through the bolt holes 114d, 116d, and 122d, with a head of the fourth bolt and/or a washer adjacent to the head of the fourth bolt proximate to or resting flush against a front surface of the rear portion of the bumper 106, and a nut threaded onto the fourth bolt and/or a washer adjacent to the nut proximate to or resting flush against a rear surface of the front frame assembly 112.

Thus, the first, second, third, and fourth bolts, and their respective heads, nuts, and washers, can securely couple and mount the mounting plate 110 and the bumper 106 to the front surface of the front frame assembly 112. Thus, when the system is fully assembled, the bumper 106 and the winch 124 housed therein are coupled to one another solely by bolts (that is, without welds) and the bumper 106 and the winch 124 housed therein are collectively coupled to the mounting plate 110, the front frame assembly 112, and the chassis of the truck solely by bolts (that is, without welds). In such an embodiment, the system 100 and the winch 124 therein may be rated for use in holding and/or moving loads of up to at least 10,000 lbs., at least 15,000 lbs., or at least 20,000 lbs.

In an alternative embodiment, when the system 100 is assembled, a first bolt extends through the bolt holes 114a, 116a, and 122a, with a head of the first bolt and/or a washer adjacent to the head of the first bolt proximate to or resting flush against a rear surface of the front frame assembly 112, and a nut threaded onto the first bolt and/or a washer adjacent to the nut proximate to or resting flush against a front surface of the rear portion of the bumper 106. Further, in the alternative embodiment, when the system 100 is assembled, a second bolt extends through the bolt holes 114b, 116b, and 122b, with a head of the second bolt and/or a washer adjacent to the head of the second bolt proximate to or resting flush against a rear surface of the front frame assembly 112, and a nut threaded onto the second bolt and/or a washer adjacent to the nut proximate to or resting flush against a front surface of the rear portion of the bumper 106.

Further, in the alternative embodiment, when the system 100 is assembled, a third bolt extends through the bolt holes 114c, 116c, and 122c, with a head of the third bolt and/or a washer adjacent to the head of the third bolt proximate to or resting flush against a rear surface of the front frame assembly 112, and a nut threaded onto the third bolt and/or a washer adjacent to the nut proximate to or resting flush against a front surface of the rear portion of the bumper 106. Further, in the alternative embodiment, when the system 100 is assembled, a fourth bolt extends through the bolt holes 114d, 116d, and 122d, with a head of the fourth bolt and/or a washer adjacent to the head of the fourth bolt proximate to or resting flush against a rear surface of the front frame assembly 112, and a nut threaded onto the fourth bolt and/or a washer adjacent to the nut proximate to or resting flush against a front surface of the rear portion of the bumper 106.

Thus, the first, second, third, and fourth bolts, and their respective heads, nuts, and washers, can securely couple and mount the mounting plate 110 and the bumper 106 to the front surface of the front frame assembly 112. Thus, when the system is fully assembled, the bumper 106 and the winch 124 housed therein are coupled to one another solely by bolts (that is, without welds) and the bumper 106 and the winch 124 housed therein are collectively coupled to the mounting plate 110, the front frame assembly 112, and the chassis of the truck solely by bolts (that is, without welds). In such an embodiment, the system 100 and the winch 124 therein may be rated for use in holding and/or moving loads of up to at least 10,000 lbs., at least 15,000 lbs., or at least 20,000 lbs.

Figure 10:
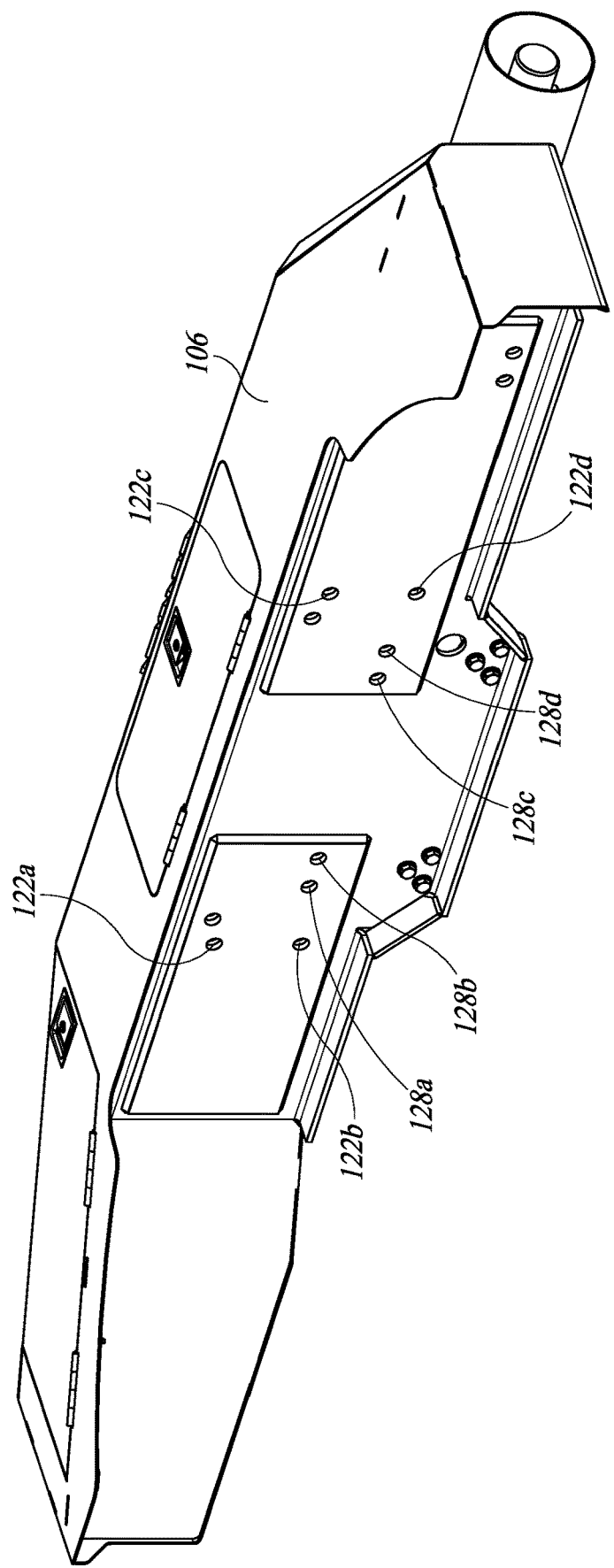
FIG. 10 illustrates the same features as FIG. 9, but with a set of bolts removed.

FIG. 10 illustrates a rear and top perspective view of the bumper 106 with a winch housed therein, with the mounting plate 110 and bolts 120a, 120b, 120c, and 120d removed to reveal additional features. In particular, FIG. 10 illustrates that the rear portion of the bumper 106 includes a set of four bolt holes 128a, 128b, 128c, and 128d that extend front-to-back through the rear portion of the bumper 106, and that the bolt holes 128a, 128b, 128c, and 128d are arranged in a pattern complementary to that of the bolts 120a, 120b, 120c, and 120d as well as that of the bolt holes 118a, 118b, 118c, and 118d. In particular, FIG. 10 illustrates that the rear portion of the bumper 106 includes a first or left pair of bolt holes 128a and 128b at a left end portion thereof and a second or right pair of bolt holes 128c and 128d at a right end portion thereof. As illustrated in FIG. 10, bolt hole 128a is located directly to the left of bolt hole 128b and bolt hole 128c is located directly to the left of bolt hole 128d.

As further illustrated in FIG. 10, the bolt holes 128a, 128b, 128c, and 128d are arranged in a single straight line, such that the bolt hole 128a is directly to the left of the bolt hole 128b, the bolt hole 128b is directly to the left of the bolt hole 128c, and the bolt hole 128c is directly to the left of the bolt hole 128d. Further, a first distance (e.g., a center-to-center distance) between the bolt holes 128a and 128b is smaller than a second distance (e.g., a center-to-center distance) between the bolt holes 128b and 128c, but is the same as a third distance (e.g., a center-to-center distance) between the bolt holes 128c and 128d. Additionally, the first distance (e.g., a center-to-center distance) between the bolt holes 128a and 128b is the same as the first distance (e.g., a center-to-center distance) between the bolt holes 118a and 118b, the second distance (e.g., a center-to-center distance) between the bolt holes 128b and 128c is the same as the second distance (e.g., a center-to-center distance) between the bolt holes 118b and 118c, and the third distance (e.g., a center-to-center distance) between the bolt holes 128c and 128d is the same as the third distance (e.g., a center-to-center distance) between the bolt holes 118c and 118d. The bolt holes 128a, 128b, 128c, and 128d have central longitudinal axes that extend forward and rearward and that are aligned with or coaxial with those of the bolt holes 118a, 118b, 118c, and 118d.

Figure 11:
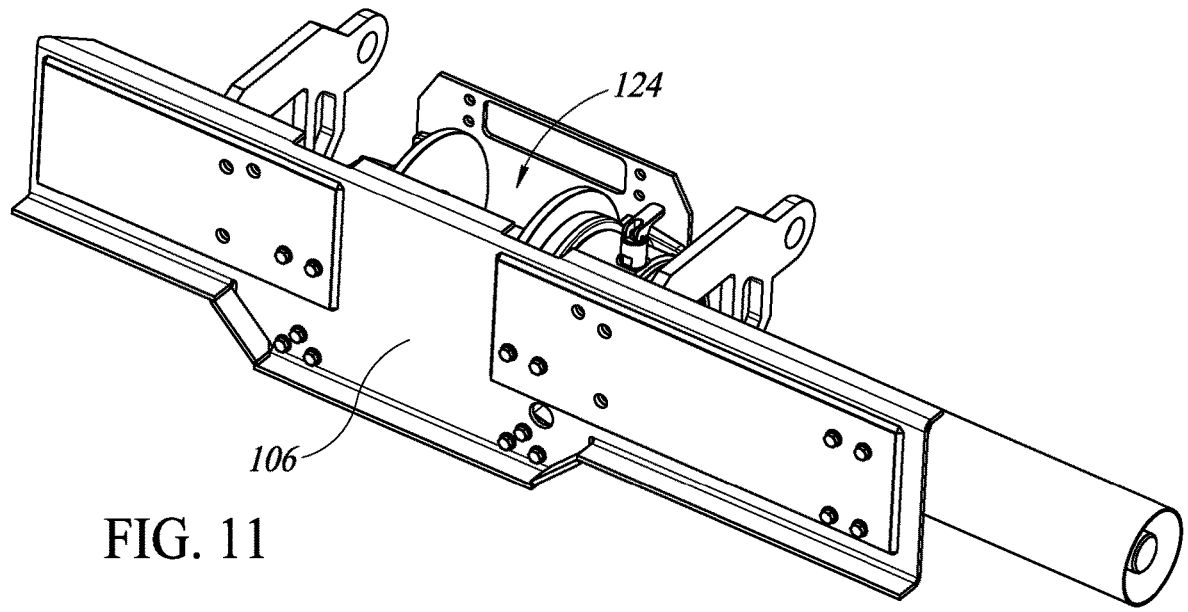
FIG. 11 illustrates the same features as FIG. 9, but with other components, including bumper components, removed.
Figure 12:
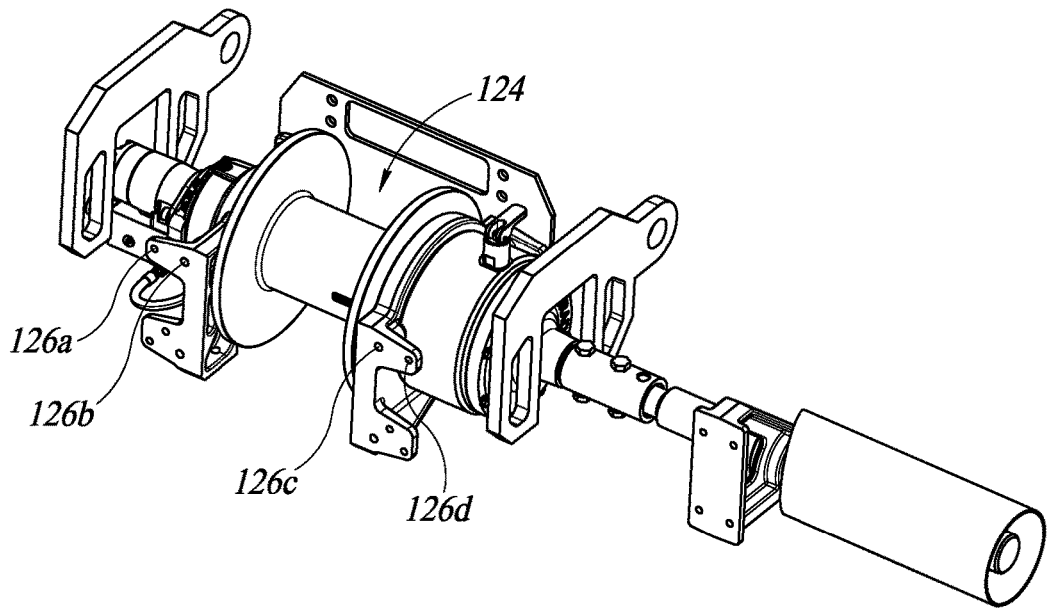
FIG. 12 illustrates the same features as FIG. 11, but with other components removed to reveal components of the winch.
Figure 13:
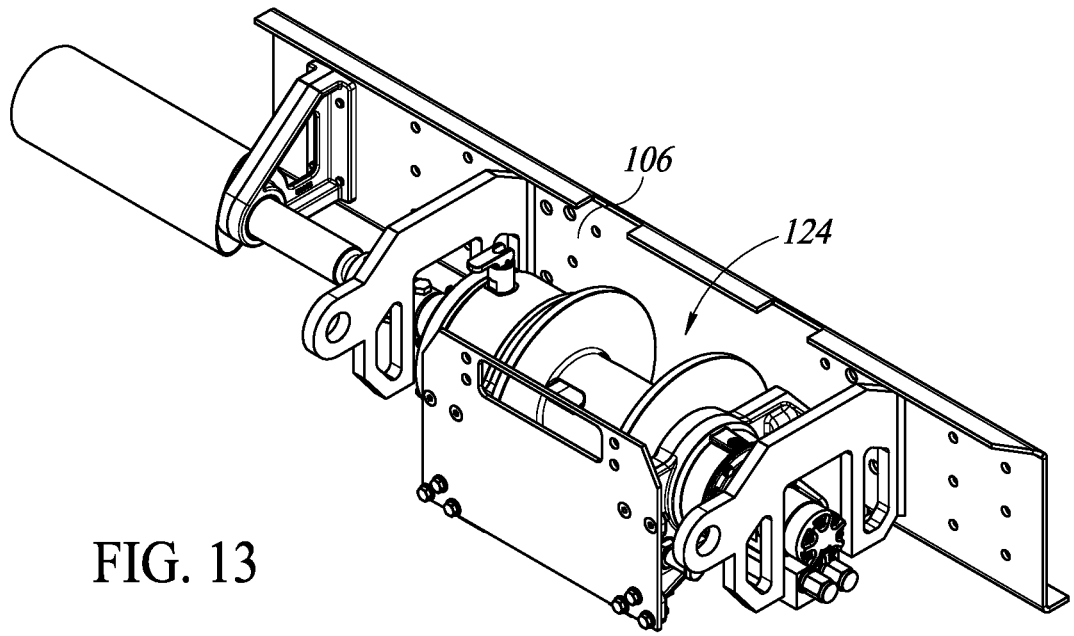
FIG. 13 illustrates the same features as FIG. 11, but from a front and top perspective view.
Figure 14:
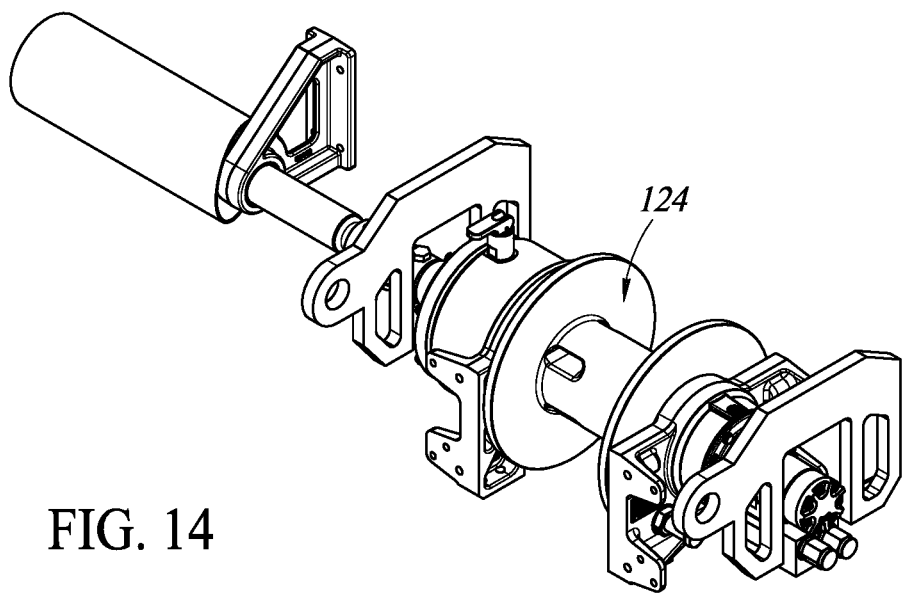
FIG. 14 illustrates the same features as FIG. 12, but from a front and top perspective view.

FIGS. 11 and 13 illustrate rear and front views, respectively, of the rear portion of the bumper 106 and a winch 124 coupled thereto with other components removed, and FIGS. 12 and 14 illustrate rear and front views, respectively, of the winch 124 with other components removed, to reveal additional components and features of the system 100. FIGS. 11-14, and FIG. 12 in particular, illustrate features of the winch 124 including a set of four bolt holes 126a, 126b, 126c, and 126d that extend front-to-back through mounting components of the winch 124. In particular, FIGS. 11-14 illustrate that the winch 124 includes a first or left pair of bolt holes 126a and 126b at a left end portion thereof and a second or right pair of bolt holes 126c and 126d at a right end portion thereof. As illustrated in FIGS. 11-14, bolt hole 126a is located directly to the left of bolt hole 126b at the left side portion of the winch 124 and bolt hole 126c is located directly to the left of bolt hole 126d at the right side portion of the winch 124.

As further illustrated in FIGS. 11-14, the bolt holes 126a, 126b, 126c, and 126d are arranged in a single straight line, such that the bolt hole 126a is directly to the left of the bolt hole 126b, the bolt hole 126b is directly to the left of the bolt hole 126c, and the bolt hole 126c is directly to the left of the bolt hole 126d. Further, a first distance (e.g., a center-to-center distance) between the bolt holes 126a and 126b is smaller than a second distance (e.g., a center-to-center distance) between the bolt holes 126b and 126c, but is the same as a third distance (e.g., a center-to-center distance) between the bolt holes 126c and 126d.

Additionally, the first distance (e.g., a center-to-center distance) between the bolt holes 118a and 118b is the same as the first distance (e.g., a center-to-center distance) between the bolt holes 126a and 126b, the second distance (e.g., a center-to-center distance) between the bolt holes 118b and 118c is the same as the second distance (e.g., a center-to-center distance) between the bolt holes 126b and 126c, and the third distance (e.g., a center-to-center distance) between the bolt holes 118c and 118d is the same as the third distance (e.g., a center-to-center distance) between the bolt holes 126c and 126d. Further, the bolt holes 126a, 126b, 126c, and 126d are each located in an upper portion of the winch 124. The bolt holes 126a, 126b, 126c, and 126d have central longitudinal axes that extend forward and rearward through the mounting components of the winch 124.

When the system 100 is assembled, the first bolt 120a can extend through the bolt hole 126a and the bolt hole 128a, with a head of the first bolt 120a and/or a washer adjacent to the head of the first bolt 120a flush against a rear surface of the rear portion of the bumper 106, and a nut threaded onto the first bolt 120a and/or a washer adjacent to the nut flush against a front surface of the mounting components of the winch 124, and/or the first bolt 120a can be threaded into threads of such bolt holes. Further, when the system 100 is assembled, the second bolt 120b can extend through the bolt hole 126b and the bolt hole 128b, with a head of the second bolt 120b and/or a washer adjacent to the head of the second bolt 120b flush against a rear surface of the rear portion of the bumper 106, and a nut threaded onto the second bolt 120b and/or a washer adjacent to the nut flush against a front surface of the mounting components of the winch 124, and/or the second bolt 120b can be threaded into threads of such bolt holes.

Further, when the system 100 is assembled, the third bolt 120c can extend through the bolt hole 126c and the bolt hole 128c, with a head of the third bolt 120c and/or a washer adjacent to the head of the third bolt 120c flush against a rear surface of the rear portion of the bumper 106, and a nut threaded onto the third bolt 120c and/or a washer adjacent to the nut flush against a front surface of the mounting components of the winch 124, and/or the third bolt 120c can be threaded into threads of such bolt holes. Further, when the system 100 is assembled, the fourth bolt 120d can extend through the bolt hole 126d and the bolt hole 128d, with a head of the fourth bolt 120d and/or a washer adjacent to the head of the fourth bolt 120d flush against a rear surface of the rear portion of the bumper 106, and a nut threaded onto the fourth bolt 120d and/or a washer adjacent to the nut flush against a front surface of the mounting components of the winch 124, and/or the fourth bolt 120d can be threaded into threads of such bolt holes.

In an alternative embodiment, when the system 100 is assembled, the first bolt 120a can extend through the bolt hole 126a and the bolt hole 128a, with a head of the first bolt 120a and/or a washer adjacent to the head of the first bolt 120a flush against a front surface of the mounting components of the winch 124, and a nut threaded onto the first bolt 120a and/or a washer adjacent to the nut flush against a rear surface of the rear portion of the bumper 106, and/or the first bolt 120a can be threaded into threads of such bolt holes. Further, in such an alternative embodiment, when the system 100 is assembled, the second bolt 120b can extend through the bolt hole 126b and the bolt hole 128b, with a head of the second bolt 120b and/or a washer adjacent to the head of the second bolt 120b flush against a front surface of the mounting components of the winch 124, and a nut threaded onto the second bolt 120b and/or a washer adjacent to the nut flush against a rear surface of the rear portion of the bumper 106, and/or the second bolt 120b can be threaded into threads of such bolt holes.

Further, when the system 100 is assembled, the third bolt 120c can extend through the bolt hole 126c and the bolt hole 128c, with a head of the third bolt 120c and/or a washer adjacent to the head of the third bolt 120c flush against a front surface of the mounting components of the winch 124, and a nut threaded onto the third bolt 120c and/or a washer adjacent to the nut flush against a rear surface of the rear portion of the bumper 106, and/or the third bolt 120c can be threaded into threads of such bolt holes. Further, when the system 100 is assembled, the fourth bolt 120d can extend through the bolt hole 126d and the bolt hole 128d, with a head of the fourth bolt 120d and/or a washer adjacent to the head of the fourth bolt 120d flush against a front surface of the mounting components of the winch 124, and a nut threaded onto the fourth bolt 120d and/or a washer adjacent to the nut flush against a rear surface of the rear portion of the bumper 106, and/or the fourth bolt 120d can be threaded into threads of such bolt holes.

In some embodiments, a method of assembling the system 100 includes coupling and securing the winch 124 to the rear portion of the bumper 106, and then coupling and securing the bumper 106 and the winch 126 to the mounting plate 110 and the front frame assembly 112. Coupling and securing the winch 124 to the rear portion of the bumper 106 may include bolting the winch 124 to the rear portion of the bumper 106 by positioning the bolt 120a to extend through the bolt holes 126a and 128a, the bolt 120b to extend through the bolt holes 126b and 128b, the bolt 120c to extend through the bolt holes 126c and 128c, and the bolt 120d to extend through the bolt holes 126d and 128d. Such coupling and securing can be accomplished without welds.

Coupling and securing the bumper 106 and the winch 126 to the mounting plate 110 and the front frame assembly 112 may include bolting the bumper 106 to the mounting plate 110 and the front frame assembly 112 by positioning a bolt to extend through the bolt holes 114a, 116a, and 122a, a bolt to extend through the bolt holes 114b, 116b, and 122b, a bolt to extend through the bolt holes 114c, 116c, and 122c, and a bolt to extend through the bolt holes 114d, 116d, and 122d. Such coupling and securing can be accomplished without welds.

Figure 15:
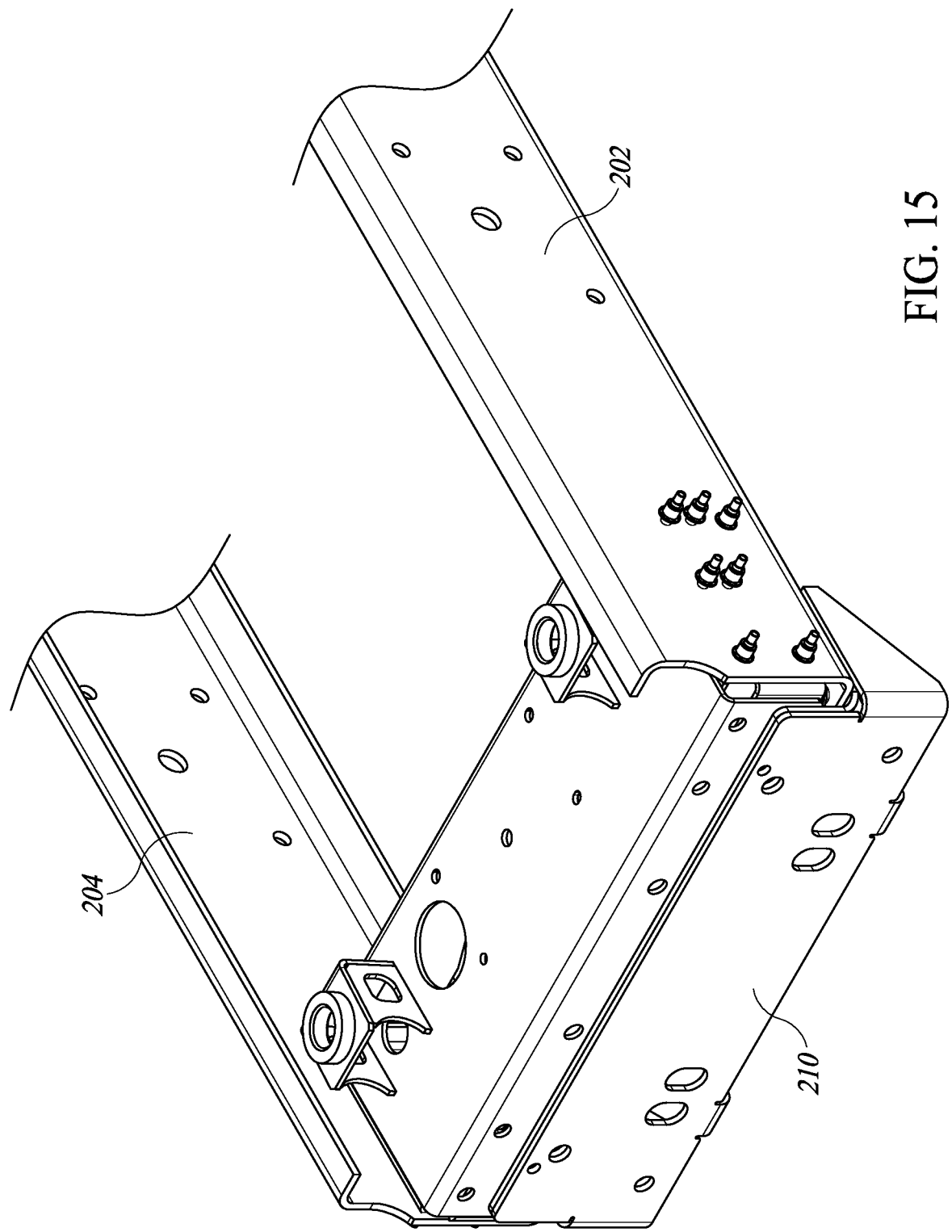
FIG. 15 illustrates the same view as FIG. 3 of counterpart components of a second truck, including a mounting plate thereof.

FIGS. 15-21 illustrate various components of a system similar to system 100. Unless described otherwise herein, the system of FIGS. 15-21 can include any of the features described herein for system 100. The description of the system of FIGS. 15-21 herein focuses on the features of the system that are not the same as the features of system 100, and any features of the system of FIGS. 15-21 that are not described herein in detail may be the same as those described herein for system 100. FIG. 15 illustrates that the system comprises components of a chassis of a second vehicle such as a truck, including a first chassis frame rail 202, which may be a left-hand side or left chassis frame rail 202, and a second chassis frame rail 204, which may be a right-hand side or right chassis frame rail 204. Similarly, unless described otherwise herein, system 100 can include any of the features described herein for the system of FIGS. 15-21.

Figure 16:
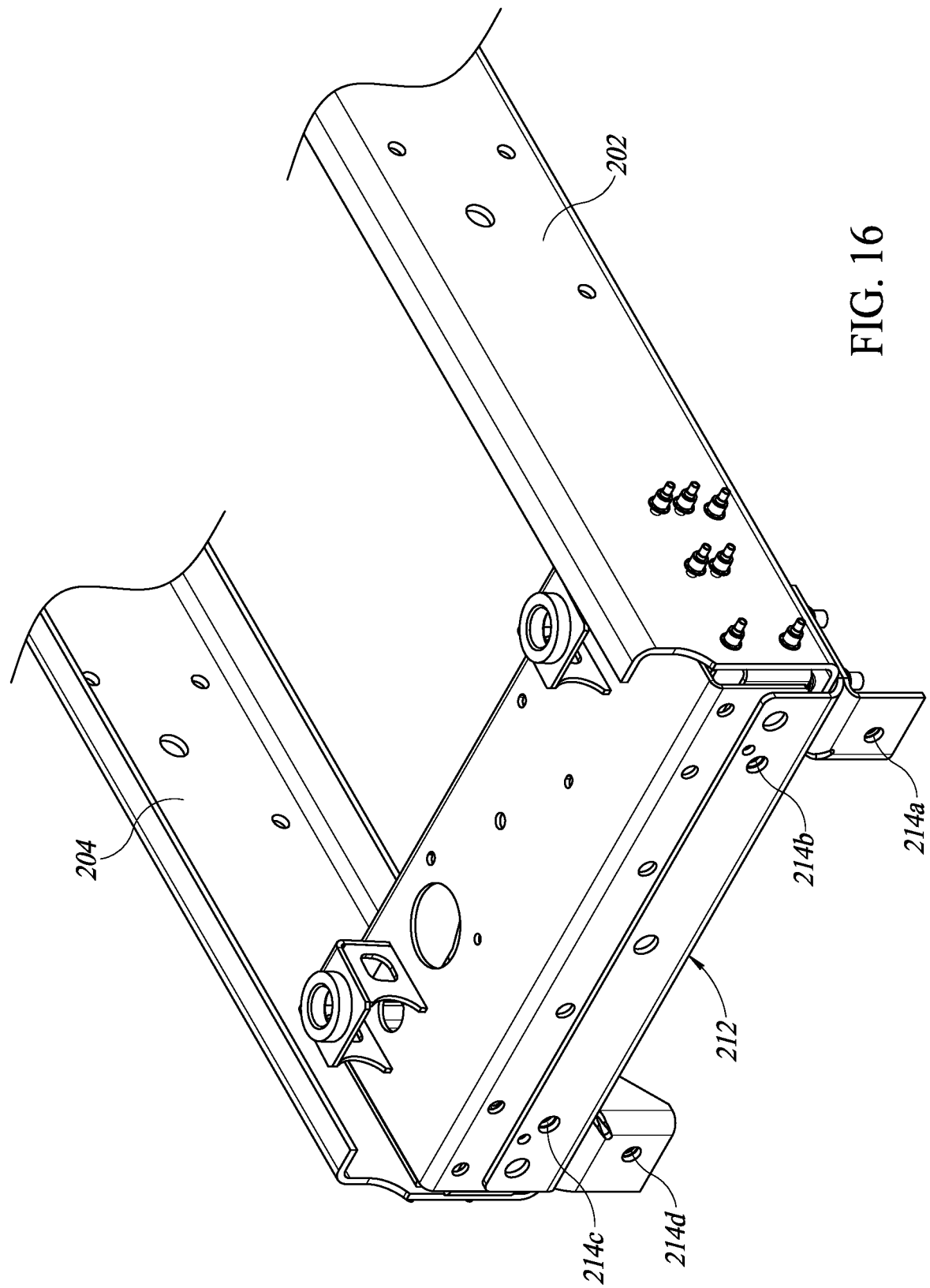
FIG. 16 illustrates the same view as FIG. 4 of counterpart components of the second truck, that is.
Figure 20:
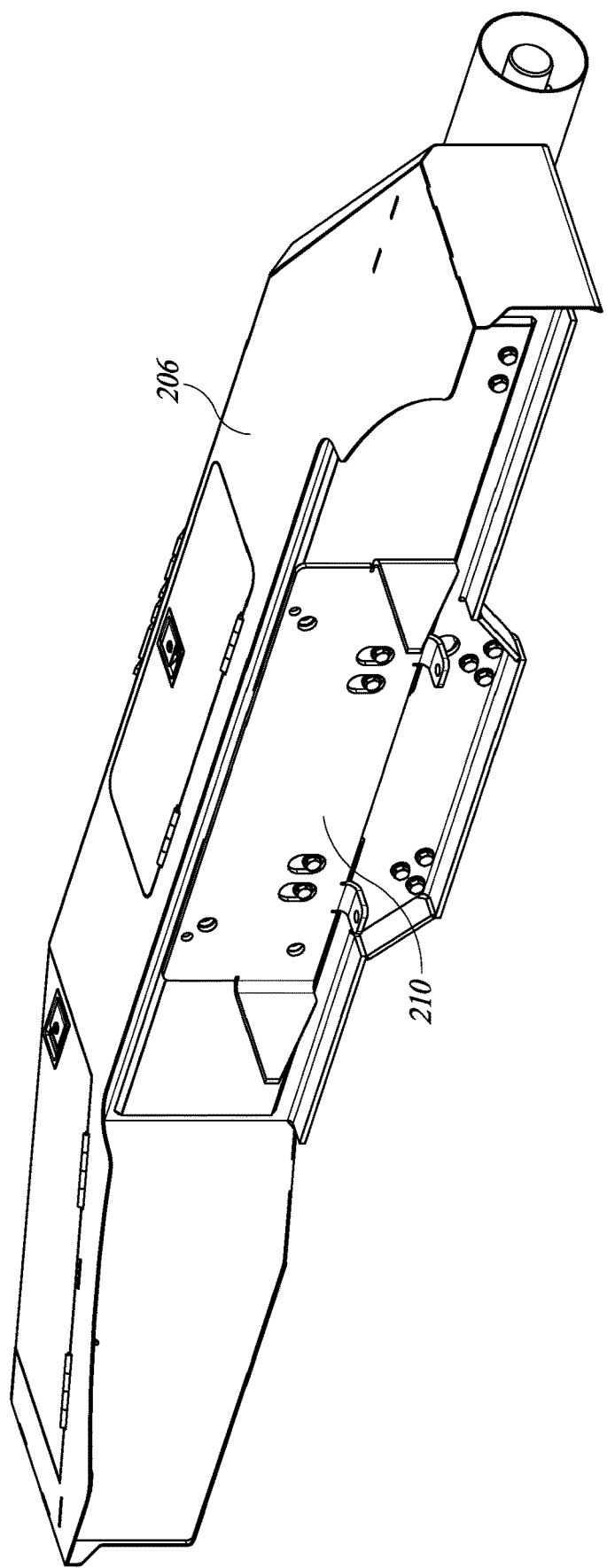
FIG. 20 illustrates the same view as FIG. 8 of counterpart components of the second truck, that is.
Figure 21:
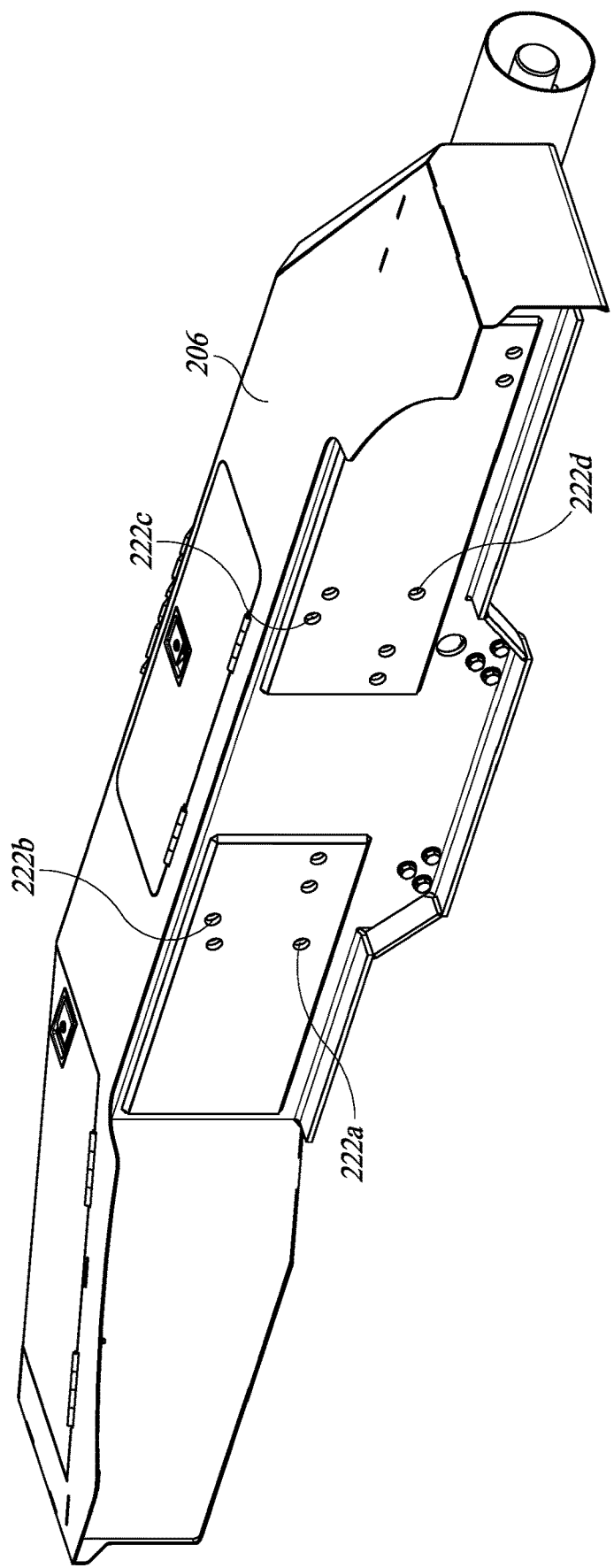
FIG. 21 illustrates the same view as FIG. 10 of counterpart components of the second truck, that is.

FIGS. 20 and 21 further illustrate that the system comprises a front bumper 206, which can house a winch, and which can be coupled at a left side portion thereof to a front end portion of the left chassis frame rail 202 and coupled at a right side portion thereof to a front end portion of the right chassis frame rail 204. FIGS. 15 and 16 illustrate the system with the bumper 206 and the winch removed to reveal additional components of the chassis of the truck, including a front frame assembly 212 thereof coupled to the left chassis frame rail 202 and the right chassis frame rail 204. FIG. 15 also illustrates a mounting plate 210 that is coupled to a front end of the front frame assembly 212. In particular, FIG. 15 illustrates that a rear surface of the mounting plate 210 is mounted flush against, and coupled directly to, a front surface of the front frame assembly 212, such that the mounting plate 210 and any other components coupled thereto are coupled to the left chassis frame rail 202 and the right chassis frame rail 204 indirectly by the front frame assembly 212.

FIG. 16 illustrates the same components from the same perspective as in FIG. 15, but with the mounting plate 210 removed, such that additional features, such as those of the front frame assembly 212, are revealed and visible. For example, FIG. 16 illustrates that the front frame assembly 212 includes four circular bolt holes that extend front-to-back through components thereof. In particular, FIG. 16 illustrates that the front frame assembly 212 includes a first or left pair of bolt holes 214a and 214b at a left end portion thereof and a second or right pair of bolt holes 214c and 214d at a right end portion thereof. As illustrated in FIG. 16, bolt hole 214a is located below and to the left of (that is, outboard of) bolt hole 214b at the left side portion of the front frame assembly 212 and bolt hole 214c is located above and to the left of (that is, inboard of) bolt hole 214d at the right side portion of the front frame assembly 212. The bolt holes 214a, 214b, 214c, and 214d have central longitudinal axes that extend forward and rearward through components of the front frame assembly 212, and are thus configured to receive bolts that couple and secure the mounting plate 210 and the bumper 206 to the front end surface of the front frame assembly 212.

Figure 17:
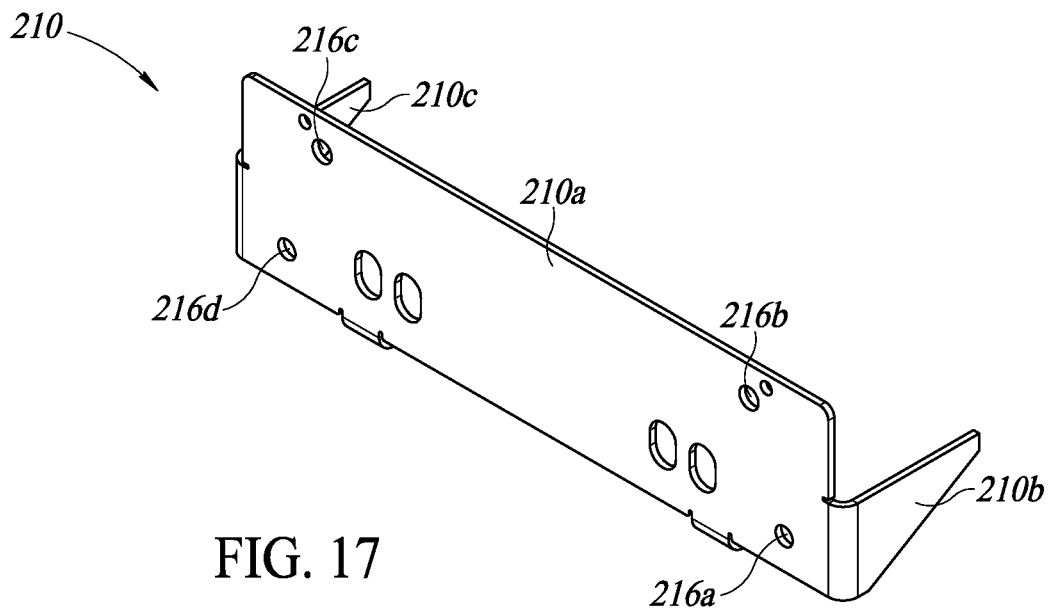
FIG. 17 illustrates a front and top perspective view of the mounting plate of the second truck.
Figure 18:
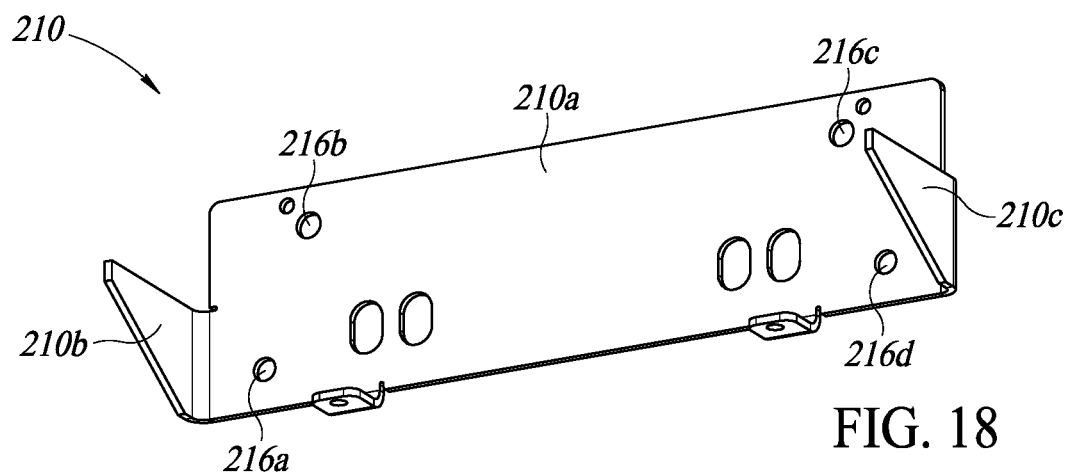
FIG. 18 illustrates a rear and bottom perspective view of the mounting plate of the second truck.
Figure 19:
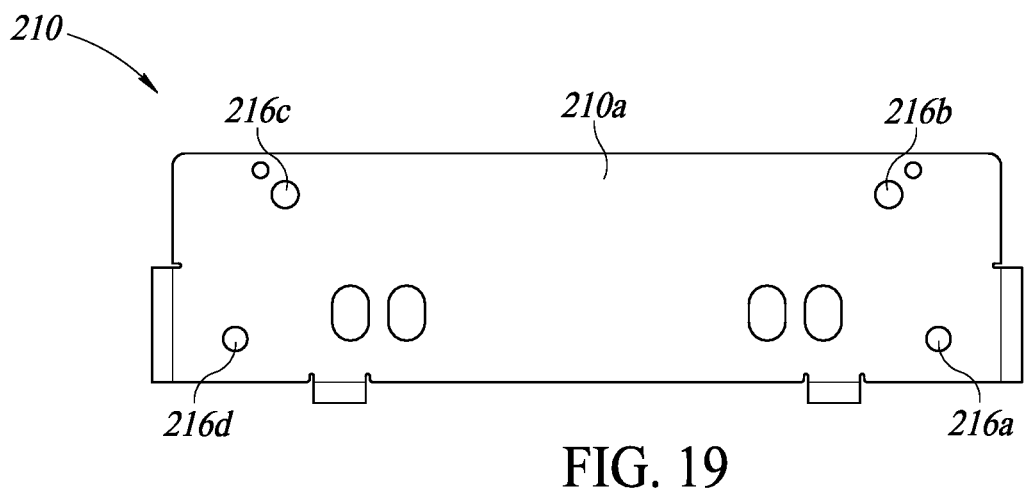
FIG. 19 illustrates a front view of the mounting plate of the second truck.

FIGS. 17, 18, and 19 illustrate a front and top perspective view, a rear and bottom perspective view, and a front view of the mounting plate 210, respectively. As illustrated in FIGS. 17-19, the mounting plate 210 includes a main body portion 210a, a first or left side portion 210b, and a second or right side portion 210c. The main body portion 210a of the mounting plate 210 includes a generally rectangular or rectilinear body or sheet of material having a long dimension or length extending side-to-side or left-to-right, such that the main body portion 210a can span across substantially the entire width of a truck. The main body portion 210a of the mounting plate 210 also has a relatively short dimension or height extending up-and-down or top-to-bottom, and a smallest dimension or a thickness extending in a front-to-back direction.

FIGS. 17-19 illustrate that the main body portion 210a includes a first set of four circular bolt holes 216a, 216b, 216c, and 216d that extend front-to-back through the main body portion 210a and that are arranged to be complementary to the bolt holes 214a, 214b, 214c, and 214d. In particular, FIGS. 17-19 illustrate that the main body portion 210a of the mounting plate 210 includes a first or left pair of bolt holes 216a and 216b at a left end portion thereof and a second or right pair of bolt holes 216c and 216d at a right end portion thereof. As illustrated in FIGS. 17-19, bolt hole 216a is located below and to the left of (that is, outboard of)

bolt hole 216*b* at the left side portion of the front frame assembly 212 and bolt hole 216*c* is located above and to the left of (that is, inboard of) bolt hole 216*d* at the right side portion of the front frame assembly 212. The bolt holes 216*a*, 216*b*, 216*c*, and 216*d* have central longitudinal axes that extend forward and rearward and that are aligned with or coaxial with those of the bolt holes 214*a*, 214*b*, 214*c*, and 214*d*. Thus, when the system is assembled, bolt hole 214*a* is adjacent to bolt hole 216*a*, bolt hole 214*b* is adjacent to bolt hole 216*b*, bolt hole 214*c* is adjacent to bolt hole 216*c*, and bolt hole 214*d* is adjacent to bolt hole 216*d*.

As illustrated in FIGS. 17-19, the bolt holes 216*a*, 216*b*, 216*c*, and 216*d* are arranged at respective corners of a trapezoidal shape. In some embodiments, a distance (such as a center-to-center distance) between the bolt hole 216*a* and the bolt hole 216*d* may be between 600 and 750 mm, between 650 and 700 mm, between 670 and 680 mm, or about 675.7 mm. Similarly, in some embodiments, a distance (such as a center-to-center distance) between the bolt hole 216*b* and the bolt hole 216*c* may be between 500 and 660 mm, between 550 and 610 mm, between 575 and 585 mm, or about 580 mm. Similarly, in some embodiments, a distance (such as a center-to-center distance) between the bolt holes 216*a* and 216*d* and the bolt holes 216*b* and 216*c* may be between 100 and 180 mm, between 130 and 140 mm, or about 138.8 mm. In some embodiments, the mounting plate 210 may be made of high-strength steel, such as a steel having a yield strength of at least 50 ksi.

FIG. 20 illustrates a rear and top perspective view of the bumper 206 with a winch housed therein, and the mounting plate 210 securely mounted to a rear portion of the bumper 206 and the winch housed therein. FIG. 21 illustrates a rear and top perspective view of the bumper 206 with a winch housed therein, and with the mounting plate 210 and a set of bolts removed therefrom to reveal other features. The bumper 206 and the winch housed therein can be identical to the bumper 106 and the winch 124 housed therein of the system 100.

FIG. 21 illustrates that the rear portion of the bumper 206 includes a set of four circular bolt holes 222*a*, 222*b*, 222*c*, and 222*d* that extend front-to-back through the rear portion of the bumper 206 and that are arranged to be complementary to the bolt holes 214*a*, 214*b*, 214*c*, and 214*d* and to the bolt holes 216*a*, 216*b*, 216*c*, and 216*d*. In particular, FIG. 21 illustrates that the rear portion of the bumper 206 includes a first or left pair of bolt holes 222*a* and 222*b* at a left end portion thereof and a second or right pair of bolt holes 222*c* and 222*d* at a right end portion thereof. As illustrated in FIG. 21, bolt hole 222*a* is located below and to the left of (that is, outboard of) bolt hole 222*b* at the left side portion of the front frame assembly 212 and bolt hole 222*c* is located above and to the left of (that is, inboard of) bolt hole 222*d* at the right side portion of the front frame assembly 212. The bolt holes 222*a*, 222*b*, 222*c*, and 222*d* have central longitudinal axes that extend forward and rearward and that are aligned with or coaxial with those of the bolt holes 214*a*, 214*b*, 214*c*, and 214*d* and of the bolt holes 216*a*, 216*b*, 216*c*, and 216*d*, and are thus configured to receive bolts that couple and secure the mounting plate 210 and the bumper 206 to the front end surface of the front frame assembly 212. Thus, when the system is assembled, bolt holes 214*a* and 216*a* are adjacent to bolt hole 222*a*, bolt holes 214*b* and 216*b* are adjacent to bolt hole 222*b*, bolt holes 214*c* and 216*c* are adjacent to bolt hole 222*c*, and bolt holes 214*d* and 216*d* are adjacent to bolt hole 222*d*.

Further, when the system is assembled, a first bolt extends through the bolt hole 214*a*, the bolt hole 216*a*, and the bolt hole 222*a*, with a head of the first bolt and/or a washer adjacent to the head of the first bolt proximate to or resting flush against a front surface of the rear portion of the bumper 206, and a nut threaded onto the first bolt and/or a washer adjacent to the nut proximate to or resting flush against a rear surface of the front frame assembly 212. Further, when the system is assembled, a second bolt extends through the bolt hole 214*b*, the bolt hole 216*b*, and the bolt hole 222*b*, with a head of the second bolt and/or a washer adjacent to the head of the second bolt proximate to or resting flush against a front surface of the rear portion of the bumper 206, and a nut threaded onto the second bolt and/or a washer adjacent to the nut proximate to or resting flush against a rear surface of the front frame assembly 212. Further, when the system is assembled, a third bolt extends through the bolt hole 214*c*, the bolt hole 216*c*, and the bolt hole 222*c*, with a head of the third bolt and/or a washer adjacent to the head of the third bolt proximate to or resting flush against a front surface of the rear portion of the bumper 206, and a nut threaded onto the third bolt and/or a washer adjacent to the nut proximate to or resting flush against a rear surface of the front frame assembly 212. Further, when the system is assembled, a fourth bolt extends through the bolt hole 214*d*, the bolt hole 216*d*, and the bolt hole 222*d*, with a head of the fourth bolt and/or a washer adjacent to the head of the fourth bolt proximate to or resting flush against a front surface of the rear portion of the bumper 206, and a nut threaded onto the fourth bolt and/or a washer adjacent to the nut proximate to or resting flush against a rear surface of the front frame assembly 212.

Thus, the first, second, third, and fourth bolts, and their respective heads, nuts, and washers, can securely couple and mount the mounting plate 210 and the bumper 206 to the front surface of the front frame assembly 212. Thus, when the system is fully assembled, the bumper 206 and the winch housed therein are coupled to one another solely by bolts (that is, without welds) and the bumper 206 and the winch housed therein are collectively coupled to the mounting plate 210, the front frame assembly 212, and the chassis of the truck solely by bolts (that is, without welds). In such an embodiment, the system and the winch therein may be rated for use in holding and/or moving loads of up to at least 30,000 lbs., at least 35,000 lbs., or at least 40,000 lbs.

In an alternative embodiment, when the system is assembled, a first bolt extends through the bolt hole 214*a*, the bolt hole 216*a*, and the bolt hole 222*a*, with a head of the first bolt and/or a washer adjacent to the head of the first bolt proximate to or resting flush against a rear surface of the front frame assembly 212, and a nut threaded onto the first bolt and/or a washer adjacent to the nut proximate to or resting flush against a front surface of the rear portion of the bumper 206. Further, in the alternative embodiment, when the system is assembled, a second bolt extends through the bolt hole 214*b*, the bolt hole 216*b*, and the bolt hole 222*b*, with a head of the second bolt and/or a washer adjacent to the head of the second bolt proximate to or resting flush against a rear surface of the front frame assembly 212, and a nut threaded onto the second bolt and/or a washer adjacent to the nut proximate to or resting flush against a front surface of the rear portion of the bumper 206.

Further, in the alternative embodiment, when the system is assembled, a third bolt extends through the bolt hole 214*c*, the bolt hole 216*c*, and the bolt hole 222*c*, with a head of the third bolt and/or a washer adjacent to the head of the third bolt proximate to or resting flush against a rear surface of the front frame assembly 212, and a nut threaded onto the third bolt and/or a washer adjacent to the nut proximate to or resting flush against a front surface of the rear portion of the bumper 206. Further, in the alternative embodiment, when the system is assembled, a fourth bolt extends through the bolt hole 214d, the bolt hole 216d, and the bolt hole 222d, with a head of the fourth bolt and/or a washer adjacent to the head of the fourth bolt proximate to or resting flush against a rear surface of the front frame assembly 212, and a nut threaded onto the fourth bolt and/or a washer adjacent to the nut proximate to or resting flush against a front surface of the rear portion of the bumper 206.

Thus, the first, second, third, and fourth bolts, and their respective heads, nuts, and washers, can securely couple and mount the mounting plate 210 and the bumper 206 to the front surface of the front frame assembly 212. Thus, when the system is fully assembled, the bumper 206 and the winch housed therein are coupled to one another solely by bolts (that is, without welds) and the bumper 206 and the winch housed therein are collectively coupled to the mounting plate 210, the front frame assembly 212, and the chassis of the truck solely by bolts (that is, without welds). In such an embodiment, the system 100 and the winch 124 therein may be rated for use in holding and/or moving loads of up to at least 30,000 lbs., at least 35,000 lbs., or at least 40,000 lbs.

In some embodiments, a method of assembling the system of FIGS. 15-21 includes coupling and securing the winch to the rear portion of the bumper 106, and then coupling and securing the bumper 106 and the winch to the mounting plate 110 and the front frame assembly 112. Coupling and securing the bumper 206 and the winch housed therein to the mounting plate 210 and the front frame assembly 212 may include bolting the bumper 206 to the mounting plate 210 and the front frame assembly 212 by positioning a bolt to extend through the bolt holes 214a, 216a, and 222a, a bolt to extend through the bolt holes 214b, 216b, and 222b, a bolt to extend through the bolt holes 214c, 216c, and 222c, and a bolt to extend through the bolt holes 214d, 216d, and 222d. Such coupling and securing can be accomplished without welds.

The use of a mounting plate as described herein, in addition to and physically between a front frame assembly of a chassis of a truck and a bumper of the truck, can provide efficiencies. For example, a manufacturer of trucks may manufacture and sell a truck that is designed for use with or without a winch. Coupling a winch to the front of a truck often requires that portions of the truck are stronger, more rigid, and/or stiffer than would otherwise be required. Thus, the manufacturer can have a single model with a single common front frame assembly that is designed for use either with or without a winch, where the mounting plate is included in trucks for customers who intend to add a winch, and is excluded for customers who do not intend to add a winch. This leads to cost and weight savings for customers who do not need the additional strength, rigidity, or stiffness associated with use of a winch, while leaving the option open for customers who do need the additional strength, rigidity, or stiffness.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A vehicle, comprising:
   a front frame assembly having a first set of bolt holes arranged in a first pattern;
   a mounting plate having a second set of bolt holes arranged in a second pattern, wherein the second pattern is the same as the first pattern, and wherein the mounting plate is coupled to the front frame assembly;
   a bumper having a third set of bolt holes arranged in a third pattern, wherein the third pattern is the same as the first pattern and the second pattern, and wherein the bumper is coupled to the mounting plate and the front frame assembly;
   a set of bolts coupling the bumper and the mounting plate to the front frame assembly, wherein the set of bolts extend through the first, second, and third sets of bolt holes; and
   a winch coupled to the bumper, whereby the combination of the winch and bumper are fixed to the front frame assembly via the set of bolts with the mounting plate positioned between the bumper and the front frame assembly.

2. The vehicle of claim 1 wherein the front frame assembly, the mounting plate, and the bumper are coupled to one another without welds.

3. The vehicle of claim 2 wherein the front frame assembly, the mounting plate, and the bumper are coupled to one another solely by the set of bolts.

4. The vehicle of claim 3 wherein the winch is coupled to the bumper solely by a second set of bolts.

5. The vehicle of claim 4 wherein the mounting plate includes a fourth set of bolt holes that provide clearance for the second set of bolts.

6. A method, comprising:
   coupling a bumper and a winch coupled to the bumper to a mounting plate and a front frame assembly of a vehicle, the front frame assembly having a first set of bolt holes arranged in a first pattern, the mounting plate having a second set of bolt holes arranged in a second pattern, the second pattern the same as the first pattern, and the bumper having a third set of bolt holes arranged in a third pattern, the third pattern the same as the first pattern and the second pattern;
   wherein coupling the bumper and the winch coupled to the bumper to the mounting plate and the front frame assembly includes positioning a set of bolts to extend through the first, second, and third sets of bolt holes.

7. The method of claim 6, wherein coupling the bumper and the winch coupled to the bumper to the mounting plate and the front frame assembly includes not welding the bumper, mounting plate, or front frame assembly to one another.

8. A system, comprising:
   a frame assembly having a first set of bolt holes arranged in a first pattern;
   a mounting plate having a second set of bolt holes arranged in a second pattern, wherein the second pattern is the same as the first pattern;
   a bumper having a third set of bolt holes arranged in a third pattern, wherein the third pattern is the same as the first pattern and the second pattern; and
   a winch coupled to the bumper,
   wherein the mounting plate is adjacent to the frame assembly and to the bumper such that the second set of bolt holes is adjacent to the first set of bolt holes and the third set of bolt holes.

9. The system of claim 8 wherein the frame assembly, the mounting plate, and the bumper are coupled to one another by a set of bolts extending through the first, second, and third sets of bolt holes.

10. The system of claim 9 wherein the frame assembly, the mounting plate, and the bumper are coupled to one another without welds.

11. A system, comprising:
- a frame assembly having a first set of bolt holes arranged in a first pattern;
- a mounting plate having a second set of bolt holes arranged in a second pattern, wherein the second pattern is the same as the first pattern;
- a bumper having a third set of bolt holes arranged in a third pattern, wherein the third pattern is the same as the first pattern and the second pattern; and
- a winch coupled to the bumper,
- wherein the frame assembly, the mounting plate, and the bumper are coupled to one another solely by a set of bolts extending through the first, second, and third sets of bolt holes.

12. The system of claim 11 wherein the winch is coupled to the bumper solely by a second set of bolts.

13. The system of claim 12 wherein the mounting plate includes a fourth set of bolt holes that provide clearance for the second set of bolts.

14. The system of claim 8 wherein the frame assembly is a front frame assembly of a truck.

15. The system of claim 8 wherein the system and the winch are rated to pull loads of at least 20,000 lbs.

16. The system of claim 8 wherein the system and the winch are rated to pull loads of at least 40,000 lbs.

17. The system of claim 8 wherein the mounting plate is made of high-strength steel having a yield strength of at least 50 ksi.

18. A system, comprising:
- a frame assembly having a first set of bolt holes arranged in a first pattern;
- a mounting plate having a second set of bolt holes arranged in a second pattern, wherein the second pattern is the same as the first pattern;
- a bumper having a third set of bolt holes arranged in a third pattern, wherein the third pattern is the same as the first pattern and the second pattern; and
- a winch coupled to the bumper,
- wherein the first, second, and third patterns each include a rectangle.

19. A system, comprising:
- a frame assembly having a first set of bolt holes arranged in a first pattern;
- a mounting plate having a second set of bolt holes arranged in a second pattern, wherein the second pattern is the same as the first pattern;
- a bumper having a third set of bolt holes arranged in a third pattern, wherein the third pattern is the same as the first pattern and the second pattern; and
- a winch coupled to the bumper,
- wherein the first, second, and third patterns each include a trapezoid.

* * * * *